United States Patent
Kaneko et al.

(10) Patent No.: US 10,236,025 B2
(45) Date of Patent: Mar. 19, 2019

(54) EVALUATION METHOD OF MAGNETIC TAPE AND MANUFACTURING METHOD OF MAGNETIC TAPE

(71) Applicant: FUJIFILM Corporation, Tokyo (JP)

(72) Inventors: Tetsuya Kaneko, Minami-ashigara (JP); Norihito Kasada, Minami-ashigara (JP); Eiki Ozawa, Minami-ashigara (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 15/854,520

(22) Filed: Dec. 26, 2017

(65) Prior Publication Data

US 2018/0182420 A1   Jun. 28, 2018

(30) Foreign Application Priority Data

Dec. 27, 2016   (JP) .................................. 2016-254442

(51) Int. Cl.
| | | |
|---|---|---|
| *G11B 5/588* | (2006.01) | |
| *G11B 5/78* | (2006.01) | |
| *G11B 5/39* | (2006.01) | |

(52) U.S. Cl.
CPC ................ *G11B 5/588* (2013.01); *G11B 5/78* (2013.01); *G11B 5/39* (2013.01); *G11B 5/3903* (2013.01); *G11B 5/3906* (2013.01); *G11B 5/3909* (2013.01)

(58) Field of Classification Search
None
See application file for complete search history.

(56) References Cited

U.S. PATENT DOCUMENTS

| | | | | |
|---|---|---|---|---|
| 2004/0207955 | A1* | 10/2004 | Seki ......................... | G11B 5/70 360/135 |
| 2007/0009769 | A1* | 1/2007 | Kanazawa .............. | B26D 1/245 428/845.5 |
| 2018/0102140 | A1* | 4/2018 | Biskeborn .......... | G11B 20/1816 |
| 2018/0102141 | A1* | 4/2018 | Biskeborn .......... | G11B 20/1816 |

FOREIGN PATENT DOCUMENTS

| | | | |
|---|---|---|---|
| JP | 2004185676 A | * | 7/2004 |
| JP | 2006-92585 A | | 4/2006 |

* cited by examiner

*Primary Examiner* — Tan X Dinh
(74) *Attorney, Agent, or Firm* — Sughrue Mion, PLLC

(57) ABSTRACT

Provided are an evaluation method of a magnetic tape, in which the magnetic tape which is an evaluation target includes a magnetic layer including a servo pattern, the method including: reading the servo pattern by a magnetic head including a tunnel magnetoresistance effect type element as a servo pattern reading element; measuring electric resistance of the tunnel magnetoresistance effect type element after the reading; and determining quality of the magnetic tape by using a degree of a decrease in the measured electric resistance from a reference value as an index, and a manufacturing method of a magnetic tape including: evaluating the magnetic tape including a servo pattern in a magnetic layer by the evaluation method.

18 Claims, 3 Drawing Sheets

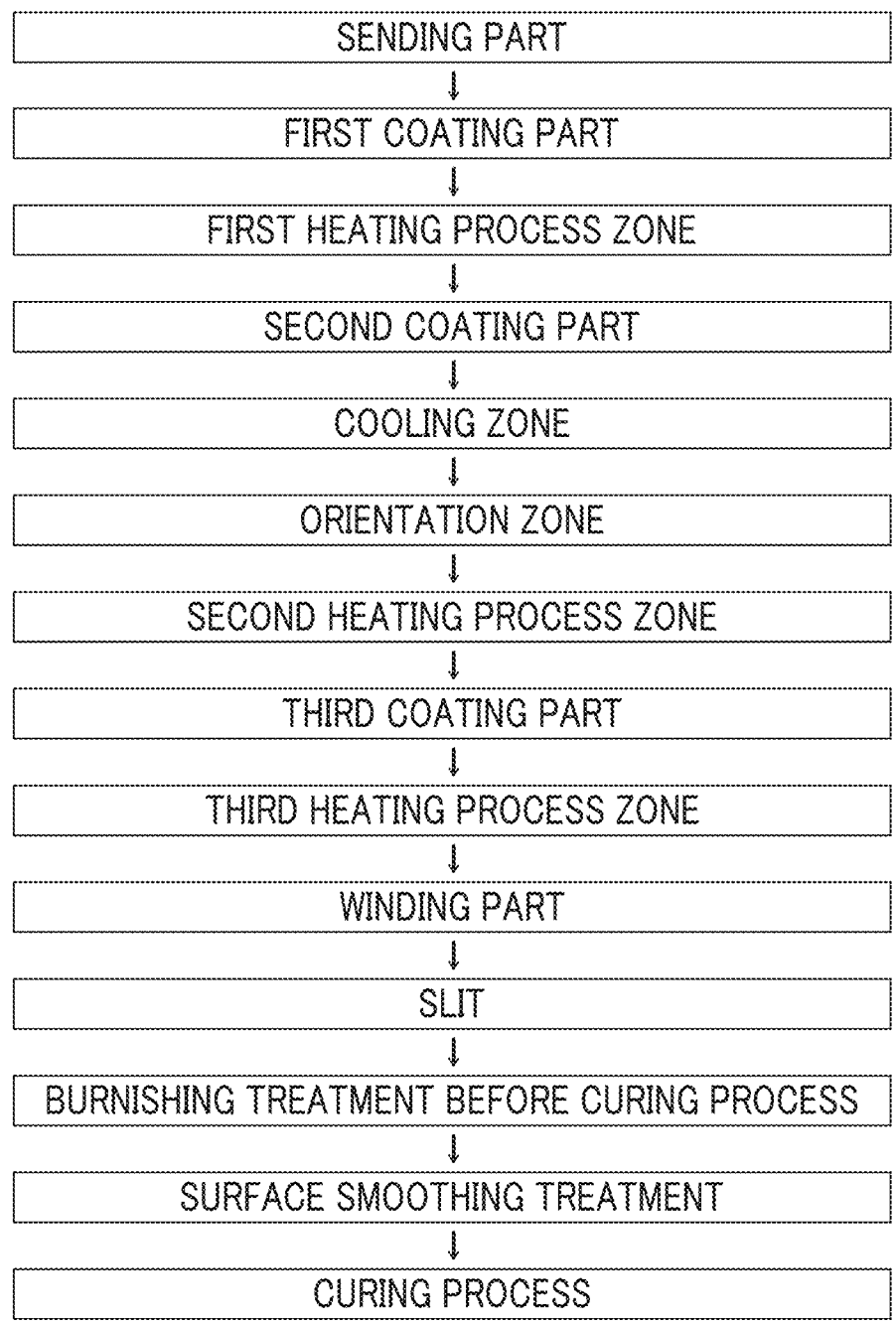

EVALUATION METHOD OF MAGNETIC TAPE AND MANUFACTURING METHOD OF MAGNETIC TAPE

CROSS-REFERENCE TO RELATED APPLICATIONS

This application claims priority under 35 U.S.C. 119 to Japanese Patent Application No. 2016-254442 filed on Dec. 27, 2016. The above application is hereby expressly incorporated by reference, in its entirety, into the present application.

BACKGROUND OF THE INVENTION

1. Field of the Invention

The present invention relates to an evaluation method of a magnetic tape and a manufacturing method of a magnetic tape.

2. Description of the Related Art

Magnetic recording media are divided into tape-shaped magnetic recording media and disk-shaped magnetic recording media, and tape-shaped magnetic recording media, that is, magnetic tapes are mainly used for data storage such as data back-up or archive. In the magnetic tape, information is normally recorded on a data band of the magnetic tape. Accordingly, data tracks are formed in the data band.

An increase in recording capacity (high capacity) of a magnetic tape is required in accordance with a great increase in information content in recent years. As means for realizing high capacity, a technology of disposing the larger amount of data tracks in a width direction of the magnetic tape by narrowing the width of the data track to increase recording density is used.

However, in a case where the width of the data track is narrowed and the recording and/or reproduction of information of a magnetic signal is performed by causing the magnetic tape to run in the magnetic tape device (generally, referred to as a "drive"), it is difficult that a magnetic head properly follows the data tracks in accordance with the position change of the magnetic tape, and errors may easily occur at the time of recording and/or reproduction. Thus, as means for preventing occurrence of such errors, a method of forming a servo pattern in the magnetic layer of the magnetic tape and performing head tracking servo has been recently proposed and practically used. The head tracking servo is to control a position of a magnetic head which performs recording and/or reproduction of information, in the magnetic tape device. The servo pattern is generally formed on the magnetic layer of the magnetic tape before being shipped as a product. In addition, regarding the servo pattern, the reading of the servo pattern is performed for inspection of the magnetic tape, as disclosed in JP2006-92585A, for example.

SUMMARY OF THE INVENTION

JP2006-92585A discloses a method of reading a servo pattern (referred to as a "servo signal" in JP2006-92585A) and inspecting quality of the read servo signal. This is an example of the pre-shipment inspection of the magnetic tape. It is desired that a magnetic tape usable in a magnetic tape device in an excellent manner is determined as a good product and shipped as a product by performing the pre-shipment inspection, and other magnetic tapes are excluded as defective products, in order to stably supply good-quality magnetic tapes to the market.

However, as described above, as means for realizing high capacity, a technology of increasing a recording density of a magnetic tape is used. However, as the recording density increases, a magnetic signal (specifically, a leakage magnetic field) obtained from a magnetic layer tends to become weak. Accordingly, it is desired that a high-sensitivity magnetic head capable of reading a weak signal with excellent sensitivity is used as a reproducing head. Regarding the sensitivity of the magnetic head, it is said that a magnetoresistive (MR) head using a magnetoresistance effect as an operating principle has excellent sensitivity, compared to an inductive head used in the related art.

As the MR head, an anisotropic magnetoresistive (AMR) head, a giant magnetoresistive (GMR) head, and a tunnel magnetoresistive (TMR) head are known. The GMR head is an MR head having excellent sensitivity than that of the AMR head. A tunnel magnetoresistive (TMR) head is an MR head having a high possibility of realizing higher sensitivity.

Meanwhile, a recording and reproducing system of the magnetic recording is broadly divided into a levitation type and a sliding type. A magnetic recording medium in which information is recorded by the magnetic recording is broadly divided into a magnetic disk and a magnetic tape. A drive including a magnetic disk as a magnetic recording medium is referred to as a "magnetic disk device" and a drive including a magnetic tape as a magnetic recording medium is referred to as a "magnetic tape device".

The magnetic disk device is generally called a hard disk drive (HDD) and a levitation type recording and reproducing system is used. In the magnetic disk device, a shape of a surface of a magnetic head slider facing a magnetic disk and a head suspension assembly that supports the magnetic head slider are designed so that a predetermined interval between a magnetic disk and a magnetic head can be maintained with air flow at the time of rotation of the magnetic disk. In such a magnetic disk device, information is recorded and reproduced in a state where the magnetic disk and the magnetic head do not come into contact with each other. The recording and reproducing system described above is the levitation type. On the other hand, a sliding type recording and reproducing system is used in the magnetic tape device. In the magnetic tape device, a surface of a magnetic layer of a magnetic tape and a magnetic head come into contact with each other and slide on each other, at the time of the recording and reproducing information.

Regarding the TMR head described above, the usage thereof in the magnetic disk device has been proposed. On the other hand, the usage of the TMR head in the magnetic tape device is still currently in a stage where the further use thereof is expected. The reason why the usage thereof is not yet practically realized is that it is not necessary that a reproducing head used in the magnetic tape device have sensitivity improved enough for using the TMR head. Nevertheless, in a case where the TMR head can be used as the reproducing head even in the magnetic tape device, it is possible to deal with higher-density recording of a magnetic tape in the future.

In a case where the width of the data track is narrowed for improving recording density and the recording and/or reproduction of information is performed by transporting the magnetic tape in the magnetic tape device, it is difficult that a magnetic head properly follows the data tracks in accordance with the position change of the magnetic tape, and errors may easily occur at the time of recording and/or reproduction. Thus, as means for preventing occurrence of such errors, a head tracking servo is used. In a magnetic servo type head tracking servo among head tracking servos, a servo pattern is formed in a magnetic layer of a magnetic tape, and this servo pattern is read by a servo head to perform head tracking servo. Such head tracking servo is more specifically performed as follows.

First, a servo head reads a servo pattern to be formed in a magnetic layer (that is, reproduces a servo signal). A position of a magnetic head which performs recording and/or reproduction of information is controlled in a magnetic tape device in accordance with a value obtained by reading the servo pattern. Accordingly, in a case of transporting the magnetic tape in the magnetic tape device for recording and/or reproducing information, it is possible to increase an accuracy of the magnetic head following the data track, even in a case where the position of the magnetic tape is changed. For example, even in a case where the position of the magnetic tape is changed in the width direction with respect to the magnetic head, in a case of recording and/or reproducing information by transporting the magnetic tape in the magnetic tape device, it is possible to control the position of the magnetic head of the magnetic tape in the width direction in the magnetic tape device, by performing the head tracking servo. By doing so, it is possible to properly record information in the magnetic tape and/or properly reproduce information recorded on the magnetic tape in the magnetic tape device.

The servo pattern is formed by magnetizing a specific position of the magnetic layer. A plurality of regions including a servo pattern (referred to as "servo bands") are generally present in the magnetic tape capable of performing the head tracking servo along a longitudinal direction. A region interposed between two servo bands is referred to as a data band. The recording of information is performed on the data band and a plurality of data tracks are formed in each data band along the longitudinal direction. In order to realize high capacity of the magnetic tape, it is preferable that the larger number of the data bands which are regions where information is recorded are present in the magnetic layer. As means for that, a technology of increasing a percentage of the data bands occupying the magnetic layer by narrowing the width of the servo band which is not a region in which information is recorded is considered. In regards to this point, the inventors have considered that, since a read track width of the servo pattern becomes narrow, in a case where the width of the servo band becomes narrow, it is desired to use a magnetic head having high sensitivity as the servo head, in order to ensure signal-to-noise-ratio (SNR) at the time of reading the servo pattern. As a magnetic head for this, the inventors focused on a TMR head which has been proposed to be used as a reproducing head in the magnetic disk device. As described above, the usage of the TMR head in the magnetic tape device is still in a stage where the future use thereof as a reproducing head for reproducing information is expected, and the usage of the TMR head as the servo head has not even proposed yet. However, the inventors have thought that it may be necessary to use the TMR head as the servo head in the magnetic tape device which performs head tracking servo, in order to deal with realization of higher sensitivity of the future magnetic tape.

With such circumstances described above, the inventors have considered to provide a new method of pre-shipment inspection, in preparation for a stage where the TMR head is necessary to be used as a reproducing head of a magnetic tape device and/or a servo head of a magnetic tape device.

That is, an object of one aspect of the invention is to provide a new evaluation method which may be the method of pre-shipment inspection of the magnetic tape.

A magnetoresistance effect which is an operating principle of the MR head such as the TMR head is a phenomenon in which electric resistance changes depending on a change in magnetic field. The MR head detects a change in leakage magnetic field generated from a magnetic recording medium as a change in electric resistance and reproduces information by converting the change in electric resistance into a change in voltage. The generation of a significant decrease in electric resistance in the TMR head may cause a decrease in reproduction output and a deterioration of electromagnetic conversion characteristics (specifically, signal-to-noise-ratio (SNR)) accompanied with that.

During intensive studies for achieving the object described above, the inventors have found a phenomenon which was not known in the related art, in that, in a case of using the TMR head as a reproducing head in the magnetic tape device, a significant decrease in electric resistance occurs in the TMR head. A decrease in electric resistance of the TMR head is a decrease in electric resistance measured by bringing an electric resistance measuring device into contact with a wiring connecting two electrodes configuring a tunnel magnetoresistance effect type element included in the TMR head. The phenomenon in which this electric resistance significantly decreases is not observed in a case of using the TMR head in the magnetic disk device, nor in a case of using other MR heads such as the GMR head in the magnetic disk device or the magnetic tape device. That is, occurrence of a significant decrease in electric resistance in the TMR head in a case of reproducing information by using the TMR head as a reproducing head was not even confirmed in the related art. A difference in the recording and reproducing system between the magnetic disk device and the magnetic tape device, specifically, contact and non-contact between a magnetic recording medium and a magnetic head at the time of the reproducing may be the reason why a significant decrease in electric resistance of the TMR head occurred in the magnetic tape device is not observed in the magnetic disk device. In addition, the TMR head has a special structure in which two electrodes are provided with an insulating layer (tunnel barrier layer) interposed therebetween in a direction in which a magnetic tape is transported, which is not applied to other MR heads which are currently practically used, and it is considered that this is the reason why a significant decrease in electric resistance occurring in the TMR head is not observed in other MR heads.

Further, the inventors have newly found during the studies that a significant decrease in electric resistance of the TMR head also occurs in a case of using the TMR head as the servo head in the magnetic tape device. In a case where the TMR head is used as the servo head, the TMR head detects a change in leakage magnetic field generated from a magnetic layer in which the servo pattern is formed, as a change in electric resistance and reads the servo pattern (reproduces a servo signal) by converting the change in electric resistance into a change in voltage. Occurrence of a significant decrease in electric resistance in the TMR head used as the servo head may cause a decrease in sensitivity of the servo head (TMR head), thereby resulting in a decrease in signal intensity of a servo signal reproduced by the servo head and a decrease in SNR accompanied with that. Accordingly, the accuracy of the head position controlling of the head tracking servo may decrease.

With the new findings described above, the inventors have considered it is necessary that the TMR head is used as a servo pattern reading head, in a case of reading a servo pattern in the pre-shipment inspection of the magnetic tape, and quality of the magnetic tape is determined by using a degree of a decrease in electric resistance of the TMR head after reading as an index. In a case of determining the quality with such an index, it is possible to stably supply magnetic tapes capable of reproducing information and/or reading a servo pattern by the TMR head without causing a significant decrease in electric resistance of the TMR head in the magnetic tape device including the TMR head as the servo head and/or the reproducing head, to the market.

That is, according to one aspect of the invention, there is provided an evaluation method of a magnetic tape, in which the magnetic tape which is an evaluation target includes a magnetic layer including a servo pattern, the method comprising: reading the servo pattern by a magnetic head (hereinafter, also referred to as a "TMR head") including a tunnel magnetoresistance effect type element (hereinafter, also referred to as a "TMR element") as a servo pattern reading element; measuring electric resistance of the tunnel magnetoresistance effect type element after the reading; and determining quality of the magnetic tape by using a degree of a decrease in the measured electric resistance from a reference value as an index.

In one aspect, the reference value is electric resistance of the tunnel magnetoresistance effect type element before the reading.

In one aspect, a center line average surface roughness Ra measured regarding a surface of the magnetic layer is equal to or smaller than 2.8 nm.

In one aspect, the center line average surface roughness Ra is equal to or smaller than 2.5 nm.

In one aspect, the magnetic tape which is the evaluation target includes a non-magnetic support, and a magnetic layer including ferromagnetic powder and a binding agent on the non-magnetic support.

In one aspect, the magnetic tape which is the evaluation target includes a non-magnetic layer which includes non-magnetic powder and a binding agent between the non-magnetic support and the magnetic layer.

In one aspect, a total thickness of the magnetic layer and the non-magnetic layer is equal to or smaller than 1.8 µm.

In one aspect, the total thickness of the magnetic layer and the non-magnetic layer is equal to or smaller than 1.1 µm.

According to another aspect of the invention, there is provided a manufacturing method of a magnetic tape comprising: preparing a magnetic tape including a servo pattern in a magnetic layer; evaluating the prepared magnetic tape by the evaluation method; determining that the evaluated magnetic tape is a magnetic tape to be shipped as a product based on the determination as a good product by the evaluation as at least one of determination criteria; and subjecting the determined magnetic tape to a pre-shipment step for shipping the magnetic tape as a product.

According to one aspect of the invention, it is possible to stably supply the magnetic tapes suitably usable in the magnetic tape device in which the TMR head is mounted to the market.

BRIEF DESCRIPTION OF THE DRAWINGS

FIG. 4 shows an example (step schematic view) of a specific aspect of a manufacturing step of a magnetic tape which will be exemplified later.

DESCRIPTION OF THE PREFERRED EMBODIMENTS

Evaluation Method of Magnetic Tape

Figure 1:
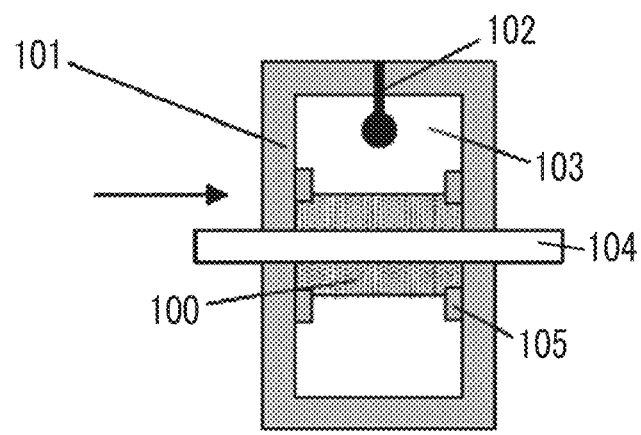
FIG. 1 is an explanatory diagram of a measurement method of logarithmic decrement.

One aspect of the invention relates to an evaluation method of a magnetic tape (hereinafter, also simply referred to as an "evaluation method"), in which the magnetic tape which is an evaluation target includes a magnetic layer including a servo pattern, the method including: reading the servo pattern by a magnetic head including a tunnel magnetoresistance effect type element as a servo pattern reading element; measuring electric resistance of the tunnel magnetoresistance effect type element after the reading; and determining quality of the magnetic tape by using a degree of a decrease in the measured electric resistance from a reference value as an index.

The TMR head is a magnetic head using a tunnel magnetoresistance effect and includes two electrodes with an insulating layer (tunnel barrier layer) interposed therebetween. The tunnel barrier layer positioned between the two electrodes is an insulating layer, and thus, even in a case where a voltage is applied between the two electrodes, in general, a current does not flow or does not substantially flow between the electrodes. However, in a case of using the TMR head as a reproducing head, a current (tunnel current) flows by a tunnel effect depending on a direction of a magnetic field of a free layer affected by a leakage magnetic field from the magnetic tape, and a change in amount of a tunnel current flow is detected as a change in electric resistance by the tunnel magnetoresistance effect. By converting the change in electric resistance into a change in voltage, information recorded on the magnetic tape can be reproduced. In a case of using the TMR head as a servo head, a current (tunnel current) flows by a tunnel effect depending on a direction of a magnetic field of a free layer affected by a leakage magnetic field from the magnetic tape in which the servo pattern is formed in the magnetic layer, and a change in amount of a tunnel current flow is detected as a change in electric resistance by the tunnel magnetoresistance effect. By converting the change in electric resistance into a change in voltage, a servo pattern formed in the magnetic tape can be read (a servo signal can be reproduced).

Examples of a structure of the MR head include a current-in-plane (CIP) structure and a current-perpendicular-to-plane (CPP) structure, and the TMR head is a magnetic head having a CPP structure. In the MR head having a CPP structure, a current flows in a direction perpendicular to a film surface of an MR element, that is, a direction in which the magnetic tape is transported, in a case of reproducing information recorded on the magnetic tape. With respect to this, other MR heads, for example, a spin valve type GMR head which is widely used in recent years among the GMR heads has a CIP structure. In the MR head having a CIP structure, a current flows in a direction in a film plane of an MR element, that is, a direction perpendicular to a direction in which the magnetic tape is transported, in a case of reproducing information recorded on the magnetic tape or reading a servo pattern formed in the magnetic layer.

As described above, the TMR head has a special structure which is not applied to other MR heads which are currently practically used. Accordingly, in a case where short circuit (bypass due to damage) occurs even at one portion between the two electrodes, the electric resistance significantly decreases. A significant decrease in electric resistance in a case of the short circuit occurring even at one portion between the two electrodes as described above is a phenomenon which does not occur in other MR heads. In the magnetic disk device using a levitation type recording and reproducing system, a magnetic disk and a magnetic head do not come into contact with each other, and thus, damage causing short circuit hardly occurs. On the other hand, in the magnetic tape device using a sliding type recording and reproducing system, in a case where any measures are not prepared, the TMR head used as a reproducing head or a servo head is damaged due to the sliding between the TMR head and the magnetic tape, and thus, short circuit easily occurs. The inventors have assumed that this is the reason why a decrease in electric resistance of the TMR head significantly occurs, in a case of using the TMR head as the reproducing head or the servo head in the magnetic tape device.

Thus, in the evaluation method, the electric resistance of the TMR element after the servo pattern reading is measured, and quality thereof is determined by using a degree of the measured electric resistance decreased from a reference value as an index. That is, the quality of the magnetic tape is determined by using a degree of a decrease in electric resistance after the servo pattern reading of the TMR head used for the servo pattern reading as an index. Accordingly, it is possible to determine whether or not the magnetic tape which is the evaluation target is a magnetic tape usable in the magnetic tape device in which the TMR head is mounted as the reproducing head and/or the servo head, without causing a significant decrease in electric resistance of the TMR head. This is because that, in a case where a significant decrease in electric resistance does not occur in the TMR head after the reading of the servo pattern, the magnetic tape which is the evaluation target may cause a significant decrease in electric resistance in the TMR head, in a case of reproducing information in the magnetic tape device in which the TMR head is mounted as the reproducing head. In addition, this is because that, in a case where a significant decrease in electric resistance does not occur in the TMR head after the reading of the servo pattern, the magnetic tape which is the evaluation target may cause a significant decrease in electric resistance in the TMR head, in a case of performing the head tracking servo in the magnetic tape device in which the TMR head is mounted as the servo head.

Hereinafter, the evaluation method will be described more specifically.

Magnetic Tape which is Evaluation Target

The magnetic tape which is the evaluation target in the evaluation method includes a servo pattern in the magnetic layer. Such a magnetic layer is, for example, a magnetic layer which at least includes ferromagnetic powder and a binding agent provided on a non-magnetic support. That is, the magnetic tape which is the evaluation target can be a tape-shaped coating type magnetic recording medium (coating type magnetic tape). The coating type magnetic tape includes a magnetic layer which at least includes ferromagnetic powder and a binding agent on a non-magnetic support, and can also include a non-magnetic layer which at least includes non-magnetic powder and a binding agent between the non-magnetic support and the magnetic layer. The coating type magnetic tape can also include a back coating layer which at least includes non-magnetic powder and a binding agent on a surface side of the non-magnetic support opposite to the surface provided with the magnetic layer. The configuration of the coating type magnetic tape is well known. For details of the configuration of the coating type magnetic tape, the description regarding one aspect of the magnetic tape which will be exemplified later can be referred to. However, the magnetic tape evaluated by the evaluation method is not limited to the magnetic tape of the aspect which will be exemplified later.

The servo pattern of the magnetic layer of the magnetic tape which is the evaluation target can be formed by magnetizing a specific position of the magnetic layer with a servo pattern recording head (also referred to as a "servo write head"). The shapes of the servo pattern with which the head tracking servo can be performed and the disposition thereof in the magnetic layer are well known. Regarding the servo pattern of the magnetic layer of the magnetic tape which is the evaluation target, a well-known technology can be used. For example, as a head tracking servo system, a timing-based servo system and an amplitude-based servo system are known. The servo pattern of the magnetic layer of the magnetic tape may be a servo pattern capable of allowing head tracking servo of any system. In addition, a servo pattern capable of allowing head tracking servo in the timing-based servo system and a servo pattern capable of allowing head tracking servo in the amplitude-based servo system may be formed in the magnetic layer.

TMR Head

In the evaluation method, the servo pattern reading head which reads the servo pattern of the magnetic tape which is the evaluation target is a TMR head. The TMR head is a magnetic head including a tunnel magnetoresistance effect type element (TMR element). The TMR element can play a role of detecting a change in leakage magnetic field from the magnetic tape as a change in electric resistance by using a tunnel magnetoresistance effect, as a servo pattern reading element for reading a servo pattern formed in the magnetic layer of the magnetic tape. By converting the detected change in electric resistance into a change in voltage, the servo pattern can be read (servo signal can be reproduced).

In the evaluation method, as the TMR head used for reading the servo pattern of the magnetic tape which is the evaluation target, a TMR head having a well-known configuration including a tunnel magnetoresistance effect type element (TMR element) can be used. For example, for details of the structure of the TMR head, materials of each unit configuring the TMR head, and the like, well-known technologies regarding the TMR head can be used.

The TMR head is a so-called thin film head. The TMR element included in the TMR head at least includes two electrode layers, a tunnel barrier layer, a free layer, and a fixed layer. The TMR head includes a TMR element in a state where cross sections of these layers face a side of a surface sliding on the magnetic tape. The tunnel barrier layer is positioned between the two electrode layers and the tunnel barrier layer is an insulating layer. Meanwhile, the free layer and the fixed layer are magnetic layers. The free layer is also referred to as a magnetization free layer and is a layer in which a magnetization direction changes depending on the external magnetic field. On the other hand, the fixed layer is a layer in which a magnetization direction does not change depending on the external magnetic field. The tunnel barrier layer (insulating layer) is positioned between the two electrodes, normally, and thus, even in a case where a voltage is applied, in general, a current does not flow or does not substantially flow. However, a current (tunnel current) flows by the tunnel effect depending on a magnetization direction of the free layer affected by a leakage magnetic field from the magnetic tape. The amount of a tunnel current flow changes depending on a relative angle of a magnetization direction of the fixed layer and a magnetization direction of the free layer, and as the relative angle decreases, the amount of the tunnel current flow increases. A change in amount of the tunnel current flow is detected as a change in electric resistance by the tunnel magnetoresistance effect. By converting the change in electric resistance into a change in voltage, the servo pattern can be read. For an example of the configuration of the TMR head, a description disclosed in FIG. 1 of JP2004-185676A can be referred to, for example. However, there is no limitation to the aspect shown in the drawing. FIG. 1 of JP2004-185676A shows two electrode layers and two shield layers. Here, a TMR head having a configuration in which the shield layer serves as an electrode layer is also well known and the TMR head having such a configuration can also be used. In the TMR head, a current (tunnel current) flows between the two electrodes and thereby changing electric resistance, by the tunnel magnetoresistance effect. The TMR head is a magnetic head having a CPP structure, and thus, a direction in which a current flows is a transportation direction of the magnetic tape. In the invention and the specification, the description regarding "orthogonal" includes a range of errors allowed in the technical field of the invention. For example, the range of errors means a range of less than ±10° from an exact orthogonal state, and the error from the exact orthogonal state is preferably within ±5° and more preferably within ±3°. A decrease in electric resistance of the TMR head means a decrease in electric resistance measured by bringing an electric resistance measuring device into contact with a wiring connecting two electrodes, and a decrease in electric resistance between two electrodes in a state where a current does not flow. In the TMR head after the servo pattern reading, in a case where the magnetic tape causing such a significant decrease in electric resistance is tentatively shipped as a product and applied to the magnetic tape device in which the TMR head is mounted as the reproducing head and/or the servo head, a significant decrease in electric resistance in the TMR head is expected. However, as described above, the occurrence of a significant decrease in electric resistance in the TMR head used as the reproducing head in the magnetic tape device may cause a decrease in reproduction output at the time of information reproduction and a deterioration of electromagnetic conversion characteristics accompanied with that. In addition, as described above, the accuracy of the head position controlling of the head tracking servo may decrease due to the occurrence of a significant decrease in electric resistance in the TMR head used as the servo head in the magnetic tape device. Regarding the magnetic tape in which a significant decrease in electric resistance of the TMR head causing such a phenomenon is expected to occur, the magnetic tape before being shipped as a product can be evaluated by the evaluation method according to one aspect of the invention and can be excluded from the magnetic tapes to be shipped as products based on the result of the evaluation.

The servo pattern formed in the magnetic layer of the magnetic tape which is the evaluation target can be read by the TMR head by causing the magnetic tape which is the evaluation target to run (transporting the magnetic tape) while bringing the surface of the magnetic layer into contact with the TMR head to slide on each other, in the same manner as the reading of the normal servo pattern performed by using the servo head for the head tracking servo. In a case where the TMR head is damaged due to the sliding here and short circuit (bypass due to damage) occurs even at one portion between two electrodes included in the TMR head, electric resistance significantly decreases. In the evaluation method, the quality of the magnetic tape is determined by using a degree of this decrease in electric resistance as an index. It is considered that, the magnetic tape in which a decrease in electric resistance obtained here is significant, may also cause a significant decrease in electric resistance of the TMR head in the magnetic tape device in which the TMR head is mounted as the reproducing head and/or the servo head, in the same manner. Thus, by determining a good product which can be shipped as a product, in a case where a degree of a decrease in electric resistance is on an acceptable level by using a degree of a decrease in electric resistance as an index, and excluding a defective product which cannot be shipped as a product, in a case where a decrease in electric resistance exceeding the acceptable level occurs, it is possible to stably supply magnetic tapes which hardly cause a significant decrease in electric resistance of the TMR head in the magnetic tape device in which the TMR head is mounted as the reproducing head and/or the servo head as products to the market.

The degree of a decrease in electric resistance which is an index of the quality determination can be obtained as the amount of a decrease in electric resistance measured in the TMR head after the servo pattern reading from a reference value. The reference value can be arbitrarily set. One aspect of the reference value is electric resistance of the TMR element measured in the TMR head before reading the servo pattern of the magnetic tape which is the evaluation target. In a case where the TMR head is damaged due to the sliding with the surface of the magnetic layer for reading the servo pattern, it is considered that, a value of electric resistance is decreased compared to a stage before the damage, that is, before the servo pattern reading. Therefore, the electric resistance of the TMR element measured in the TMR head before reading the servo pattern of the magnetic tape which is the evaluation target is suitable as the reference value. However, the reference value is not limited thereto. For example, in a case where the surface of the magnetic layer slides on the TMR head continuously and/or intermittently for the magnetic tape which is the evaluation target, it is also possible to perform the quality determination of the magnetic tape which is the evaluation target, by setting the electric resistance of the TMR element measured in the TMR head in the initial stage after starting the sliding as the reference value, and by setting the amount of a decrease in electric resistance of the TMR element measured in the TMR head after repeating the sliding from the reference value as an index. In addition, the reference value is not limited to the electric resistance of the TMR element measured in the TMR head used for reading the servo pattern of the magnetic tape which is the evaluation target. If necessary, the reference value can also be set by performing a preliminary experiment. The quality determination can be performed based on the following standards, for example. However, the following standards are examples and the invention is not limited to an aspect in which the quality determination is performed based on the following exemplified standards. In addition, there is no limitation regarding the following threshold values and the threshold values can be suitably set in accordance with quality necessary for a magnetic tape product.

(1) The magnetic tape which is the evaluation target is caused to run (transported) continuously or intermittently, the TMR head is brought into contact with the surface of the magnetic layer of the running magnetic tape, and sliding between the surface of the magnetic layer and the TMR head is repeated. During the repeated sliding, the running is temporarily stopped for each predetermined interval and electric resistance in the TMR head is measured. In a case where a difference between the electric resistance measured as described above (hereinafter, referred to as "electric resistance after running) and a reference value (reference value–electric resistance after running) exceeds a threshold value set in advance, it is determined that a significant decrease in electric resistance occurs. In addition, in a case where a rate of a decrease in electric resistance (for example, "(reference value–electric resistance after running)/reference value", "(reference value–electric resistance after running)/reference value×100", and the like) exceeds a threshold value set in advance, it is determined that a significant decrease in electric resistance occurs. In a case where the sliding is repeatedly performed while arbitrarily replacing the TMR heads and the number of times of occurrence of a significant decrease in electric resistance exceeds a threshold value set in advance, it is determined that the magnetic tape which is the evaluation target is a defective product. On the other hand, in a case where the number of times of occurrence of a significant decrease in electric resistance is equal to or smaller than a threshold value set in advance, it is determined that the magnetic tape which is the evaluation target is a good product.

(2) In a case where the difference between the electric resistance after running and the reference value and/or the rate of a decrease in electric resistance described above exceed threshold values set in advance, it is determined that the magnetic tape which is the evaluation target is a defective product. On the other hand, in a case where the number of times of occurrence of a significant decrease in electric resistance is equal to or smaller than a threshold value set in advance, it is determined that the magnetic tape which is the evaluation target is a good product.

Meanwhile, as the magnetic tape is transported at a high speed in the magnetic tape device, it is possible to shorten the time for recording information and/or the time for reproducing information. On the other hand, it is desired that the magnetic tape is transported at a low speed, in order to prevent a deterioration in recording and reproducing characteristics. From the viewpoint described above, in a case of reading a servo pattern by the servo head in order to perform head tracking servo at the time of recording and/or reproducing information, a relative speed of the magnetic tape and the servo head is preferably equal to or lower than 18 m/sec, more preferably equal to or lower than 15 m/sec, and even more preferably equal to or lower than 10 m/sec. In addition, from a viewpoint of preventing a deterioration in recording and reproducing characteristics, a relative speed of the magnetic tape and the reproducing head is also preferably equal to or lower than 18 m/sec, more preferably equal to or lower than 15 m/sec, and even more preferably equal to or lower than 10 m/sec. However, as the relative speed of the reproducing head or the servo head and the magnetic tape is low, the time for which the same portion of the TMR head which reproduces information or reads the servo pattern comes into contact with the magnetic tape increases, and accordingly, damage on the TMR head more easily occurs and a significant decrease in electric resistance may easily occur. From a viewpoint of preventing occurrence of such a significant decrease in electric resistance in the magnetic tape device in which the TMR head is mounted as the reproducing head and/or the servo head, the relative speed of the TMR head and the magnetic tape in the evaluation method is preferably equal to or lower than 18 m/sec, more preferably equal to or lower than 15 m/sec, and even more preferably equal to or lower than 10 m/sec. The relative speed of the TMR head and the magnetic tape in the evaluation method can be, for example, equal to or higher than 1 m/sec. The relative speed of the magnetic head such as the reproducing head, the servo head, or a head for evaluation, and the magnetic tape is also referred to as a magnetic tape transportation speed or a running speed.

The magnetic tape is generally accommodated in a magnetic tape cartridge, and shipped, and is on the market. The magnetic tape to be evaluated by the evaluation method may have a shape before being accommodated in the magnetic tape cartridge or may have a shape after being accommodated in the magnetic tape cartridge. The configuration of the magnetic tape cartridge is well known.

The evaluation method according to one aspect of the invention described above can be suitably used as a method of pre-shipment inspection of the magnetic tape product. A specific aspect in which the evaluation method is used as the pre-shipment inspection will be described later.

Manufacturing Method of Magnetic Tape

One aspect of the invention relates to a manufacturing method of a magnetic tape (hereinafter, also simply referred to as a "manufacturing method") including: preparing a magnetic tape including a servo pattern in a magnetic layer; evaluating the prepared magnetic tape by the evaluation method; determining that the evaluated magnetic tape is a magnetic tape to be shipped as a product based on the determination as a good product by the evaluation as at least one of determination criteria; and subjecting the determined magnetic tape to a pre-shipment step for shipping the magnetic tape as a product.

In the manufacturing method, the magnetic tape is evaluated by the evaluation method according to one aspect of the invention as the pre-shipment inspection of the tape product. Hereinafter, the manufacturing method will be described more specifically.

Preparation of Magnetic Tape

Regarding the magnetic tape subjected to the pre-shipment inspection, the above description regarding the magnetic tape which is the evaluation target of the evaluation method can be referred to.

According to the studies of the inventors, as the magnetic tape which hardly causes a decrease in electric resistance of the TMR head, a magnetic tape including a magnetic layer including ferromagnetic powder and a binding agent on a non-magnetic support and in which logarithmic decrement acquired by a pendulum viscoelasticity test performed regarding the surface of the magnetic layer is equal to or smaller than 0.050. Hereinafter, such a magnetic tape will be described as an example. However, the magnetic tape of the invention is not limited to the magnetic tape exemplified below.

In the invention and the specification, the magnetic layer side logarithmic decrement is a value acquired by the following method.

Figure 2:
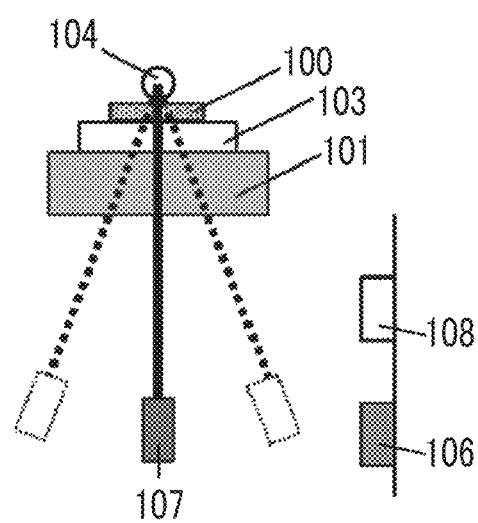
FIG. 2 is an explanatory diagram of the measurement method of logarithmic decrement.
Figure 3:
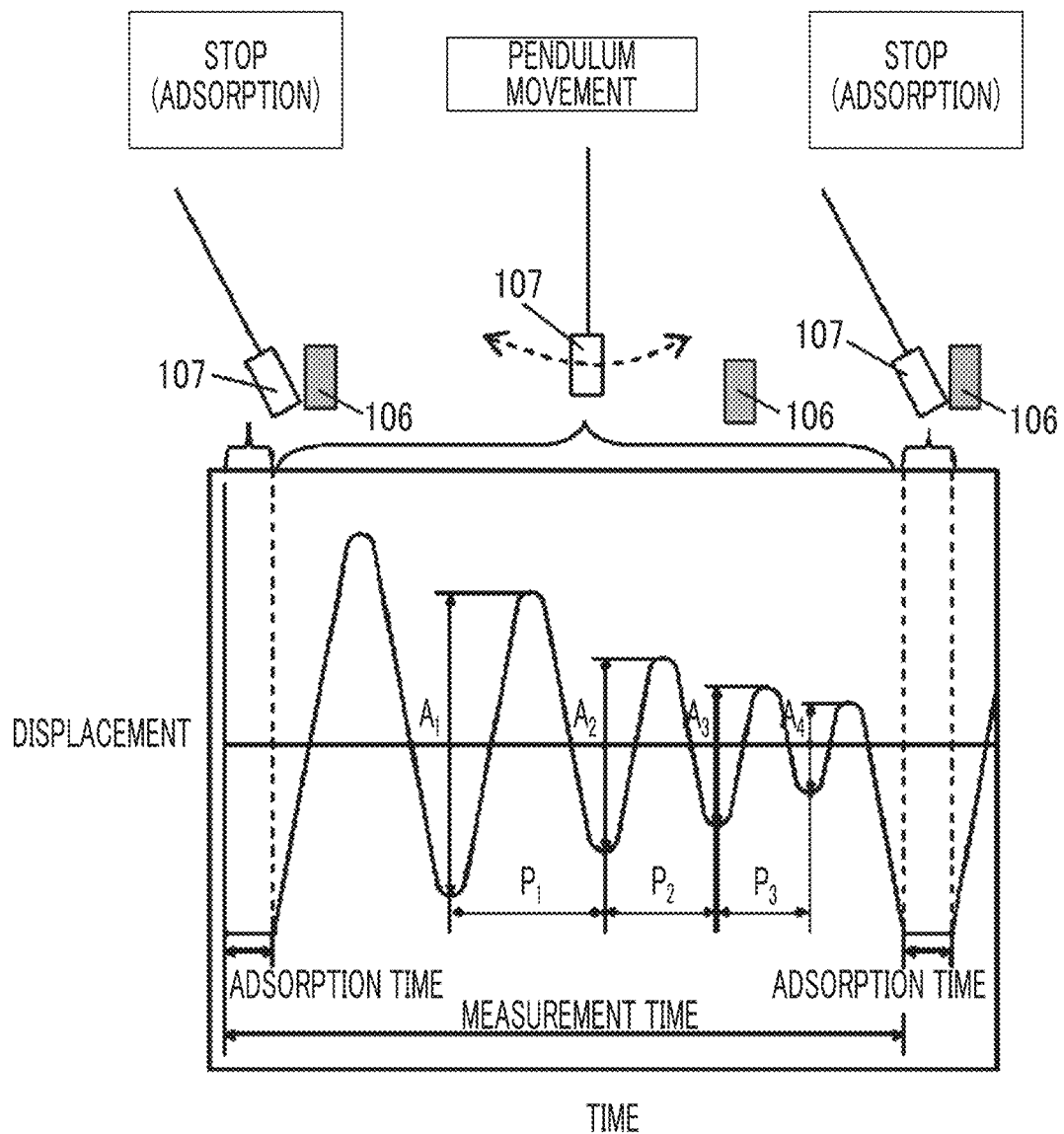
FIG. 3 is an explanatory diagram of the measurement method of logarithmic decrement.

FIGS. 1 to 3 are explanatory diagrams of a measurement method of the logarithmic decrement. Hereinafter, the measurement method of the logarithmic decrement will be described with reference to the drawings. However, the aspect shown in the drawing is merely an example and the invention is not limited thereto.

A measurement sample 100 is cut out from the magnetic tape which is a measurement target. The cut-out measurement sample 100 is placed on a substrate 103 so that a measurement surface (surface of the magnetic layer) faces upwards, in a sample stage 101 in a pendulum viscoelasticity tester, and the measurement sample is fixed by fixing tapes 105 in a state where obvious wrinkles which can be visually confirmed are not generated.

A pendulum-attached columnar cylinder edge 104 (diameter of 4 mm) having mass of 13 g is loaded on the measurement surface of the measurement sample 100 so that a long axis direction of the cylinder edge becomes parallel to a longitudinal direction of the measurement sample 100. An example of a state in which the pendulum-attached columnar cylinder edge 104 is loaded on the measurement surface of the measurement sample 100 as described above (state seen from the top) is shown in FIG. 1. In the aspect shown in FIG. 1, a holder and temperature sensor 102 is installed and a temperature of the surface of the substrate 103 can be monitored. However, this configuration is not essential. In the aspect shown in FIG. 1, the longitudinal direction of the measurement sample 100 is a direction shown with an arrow in the drawing, and is a longitudinal direction of a magnetic tape from which the measurement sample is cut out. In the invention and the specification, the description regarding "parallel" includes a range of errors allowed in the technical field of the invention. For example, the range of errors means a range of less than ±10° from an exact parallel state, and the error from the exact parallel state is preferably within ±5° and more preferably within ±3°. In addition, as a pendulum 107 (see FIG. 2), a pendulum formed of a material having properties of being adsorbed to a magnet (for example, formed of metal or formed of an alloy) is used.

The temperature of the surface of the substrate 103 on which the measurement sample 100 is placed is set to 80° C. by increasing the temperature at a rate of temperature increase equal to or lower than 5° C./min (arbitrary rate of temperature increase may be set, as long as it is equal to or lower than 5° C./min), and the pendulum movement is started (induce initial vibration) by releasing adsorption between the pendulum 107 and a magnet 106. An example of a state of the pendulum 107 which performs the pendulum movement (state seen from the side) is shown in FIG. 2. In the aspect shown in FIG. 2, in the pendulum viscoelasticity tester, the pendulum movement is started by stopping (switching off) the electricity to the magnet (electromagnet) 106 disposed on the lower side of the sample stage to release the adsorption, and the pendulum movement is stopped by restarting (switching on) the electricity to the electromagnet to cause the pendulum 107 to be adsorbed to the magnetic 106. As shown in FIG. 2, during the pendulum movement, the pendulum 107 reciprocates the amplitude. From a result obtained by monitoring displacement of the pendulum with a displacement sensor 108 while the pendulum reciprocates the amplitude, a displacement-time curve in which a vertical axis indicates the displacement and a horizontal axis indicates the elapsed time is obtained. An example of the displacement-time curve is shown in FIG. 3. FIG. 3 schematically shows correspondence between the state of the pendulum 107 and the displacement-time curve. The rest (adsorption) and the pendulum movement are repeated at a regular measurement interval, the logarithmic decrement Δ (no unit) is acquired from the following Expression by using a displacement-time curve obtained in the measurement interval after 10 minutes or longer (may be arbitrary time, as long as it is 10 minutes or longer) has elapsed, and this value is set as logarithmic decrement of the surface of the magnetic layer of the magnetic tape. The adsorption time of the first adsorption is set as 1 second or longer (may be arbitrary time, as long as it is 1 second or longer), and the interval between the adsorption stop and the adsorption start is set as 6 seconds or longer (may be arbitrary time, as long as it is 6 seconds or longer). The measurement interval is an interval of the time from the adsorption start and the next adsorption start. In addition, humidity of an environment in which the pendulum movement is performed, may be arbitrary relative humidity, as long as the relative humidity is 40% to 70%.

$$\Delta = \frac{\ln\left(\frac{A_1}{A_2}\right) + \ln\left(\frac{A_2}{A_3}\right) + \ldots \ln\left(\frac{A_n}{A_{n+1}}\right)}{n}$$

In the displacement-time curve, an interval between a point of the minimum displacement and a point of the next minimum displacement is set as a period of a wave. n indicates the number of waves included in the displacement-time curve in the measurement interval, and An indicate the minimum displacement and maximum displacement of the n-th wave. In FIG. 3, an interval between the minimum displacement of the n-th wave and the next minimum displacement is shown as Pn (for example, $P_1$ regarding the first wave, $P_2$ regarding the second wave, and $P_3$ regarding the third wave). In the calculation of the logarithmic decrement, a difference (in Expression $A_{n+1}$, in the displacement-time curve shown in FIG. 3, $A_4$) between the minimum displacement and the maximum displacement appearing after the n-th wave is also used, but a part where the pendulum 107 stops (adsorption) after the maximum displacement is not used in the counting of the number of waves. In addition, a part where the pendulum 107 stops (adsorption) before the maximum displacement is not used in the counting of the number of waves, either. Accordingly, the number of waves is 3 (n=3) in the displacement-time curve shown in FIG. 3.

The inventors have considered that the logarithmic decrement is an index for the amount of pressure sensitive adhesive components separated from the magnetic tape, in a case where the TMR head comes into contact with the magnetic tape and slides on the magnetic tape, and interposed between the magnetic tape and the TMR head. The inventors have considered that, as a larger amount of the pressure sensitive adhesive components is present, adhesiveness between the magnetic tape and the TMR head increases, and this disturb smooth sliding between the magnetic tape and the TMR head (sliding properties are deteriorated). With respect to this, the inventors have considered that, in the magnetic tape, a state where the logarithmic decrement is equal to or smaller than 0.050, that is, a state where the amount of the pressure sensitive adhesive components is decreased contributes to smooth sliding between the magnetic tape and the TMR head. As a result, the inventors have surmised that it is possible to prevent occurrence of short circuit due to damage on the TMR head due to the sliding on the magnetic tape.

The details of the pressure sensitive adhesive components are not clear. The inventors have surmised that the pressure sensitive adhesive components may be derived from a resin used as a binding agent. The specific description is as follows. As a binding agent, various resins can be used as will be described later in detail. The resin is a polymer (including a homopolymer or a copolymer) of two or more polymerizable compounds and generally also includes a component having a molecular weight which is smaller than an average molecular weight (hereinafter, referred to as a "binding agent component having a low molecular weight"). The inventors have surmised that the binding agent component having a low molecular weight which is separated from the magnetic tape at the time of sliding between the magnetic tape and the TMR head and interposed between the magnetic tape and the TMR head may cause a decrease in sliding properties. The inventors have surmised that, the binding agent component having a low molecular weight may have pressure sensitive adhesive properties and the logarithmic decrement acquired by a pendulum viscoelasticity test may be an index for the amount of binding agent components having a low molecular weight separated from the magnetic tape at the time of the sliding between the magnetic tape and the TMR head. In one aspect, the magnetic layer is formed by applying a magnetic layer forming composition including a curing agent in addition to ferromagnetic powder and a binding agent onto a non-magnetic support directly or with another layer interposed therebetween, and performing curing process. With the curing process here, it is possible to allow a curing reaction (crosslinking reaction) between the binding agent and the curing agent. However, although the reason thereof is not clear, the inventors have considered that the binding agent component having a low molecular weight may have poor reactivity regarding the curing reaction. Accordingly, the inventors have surmised that the binding agent component having a low molecular weight which hardly remains in the magnetic layer and is easily separated from the magnetic layer may be one of reasons for that the binding agent component having a low molecular weight is interposed between the magnetic tape and the TMR head at the time of the sliding between the magnetic tape and the TMR head.

However, the above-mentioned description is merely a surmise of the inventors and the invention is not limited thereto.

Hereinafter, the magnetic tape will be described more specifically. However, as described above, the magnetic tape of the invention is not limited to the magnetic tape exemplified below.

Magnetic Layer

Logarithmic Decrement

The logarithmic decrement acquired by a pendulum viscoelasticity test performed regarding the surface of the magnetic layer of the magnetic tape is equal to or smaller than 0.050. Accordingly, it is possible to prevent occurrence of a significant decrease in electric resistance in the TMR head which slides on the surface of the magnetic layer of the magnetic tape. The logarithmic decrement is preferably equal to or smaller than 0.048, more preferably equal to or smaller than 0.045, and even more preferably equal to or smaller than 0.040, from a viewpoint of further preventing a significant decrease in electric resistance of the TMR head. Meanwhile, from a viewpoint of preventing a significant decrease in electric resistance of the TMR head, it is preferable that the logarithmic decrement is low, and thus, a lower limit value is not particularly limited. The logarithmic decrement can be, for example, equal to or greater than 0.010 or equal to or greater than 0.015. However, the logarithmic decrement may be smaller than the exemplified value. A specific aspect of a method for adjusting the logarithmic decrement will be described later. In addition, in the invention and the specification, the "surface of the magnetic layer" is identical to the surface of the magnetic tape on the magnetic layer side.

Ferromagnetic Powder

As the ferromagnetic powder included in the magnetic layer, ferromagnetic powder normally used in the magnetic layer of various magnetic recording media can be used. It is preferable to use ferromagnetic powder having a small average particle size, from a viewpoint of improvement of recording density of the magnetic tape. From this viewpoint, ferromagnetic powder having an average particle size equal to or smaller than 50 nm is preferably used as the ferromagnetic powder. Meanwhile, the average particle size of the ferromagnetic powder is preferably equal to or greater than 10 nm, from a viewpoint of stability of magnetization.

As a preferred specific example of the ferromagnetic powder, ferromagnetic hexagonal ferrite powder can be used. An average particle size of the ferromagnetic hexagonal ferrite powder is preferably 10 nm to 50 nm and more preferably 20 nm to 50 nm, from a viewpoint of improvement of recording density and stability of magnetization. For details of the ferromagnetic hexagonal ferrite powder, descriptions disclosed in paragraphs 0012 to 0030 of JP2011-225417A, paragraphs 0134 to 0136 of JP2011-216149A, and paragraphs 0013 to 0030 of JP2012-204726A can be referred to, for example.

As a preferred specific example of the ferromagnetic powder, ferromagnetic metal powder can also be used. An average particle size of the ferromagnetic metal powder is preferably 10 nm to 50 nm and more preferably 20 nm to 50 nm, from a viewpoint of improvement of recording density and stability of magnetization. For details of the ferromagnetic metal powder, descriptions disclosed in paragraphs 0137 to 0141 of JP2011-216149A and paragraphs 0009 to 0023 of JP2005-251351A can be referred to, for example.

In the invention and the specification, average particle sizes of various powder such as the ferromagnetic powder and the like are values measured by the following method with a transmission electron microscope, unless otherwise noted.

The powder is imaged at a magnification ratio of 100,000 with a transmission electron microscope, the image is printed on printing paper so that the total magnification of 500,000 to obtain an image of particles configuring the powder. A target particle is selected from the obtained image of particles, an outline of the particle is traced with a digitizer, and a size of the particle (primary particle) is measured. The primary particle is an independent particle which is not aggregated.

The measurement described above is performed regarding 500 particles arbitrarily extracted. An arithmetical mean of the particle size of 500 particles obtained as described above is an average particle size of the powder. As the transmission electron microscope, a transmission electron microscope H-9000 manufactured by Hitachi, Ltd. can be used, for example. In addition, the measurement of the particle size can be performed by well-known image analysis software, for example, image analysis software KS-400 manufactured by Carl Zeiss.

In the invention and the specification, the average particle size of the ferromagnetic powder and other powder is an average particle size obtained by the method described above, unless otherwise noted. The average particle size shown in examples which will be described later is a value measured by using transmission electron microscope H-9000 manufactured by Hitachi, Ltd. as the transmission electron microscope, and image analysis software KS-400 manufactured by Carl Zeiss as the image analysis software, unless otherwise noted. In the invention and the specification, the powder means an aggregate of a plurality of particles. For example, the ferromagnetic powder means an aggregate of a plurality of ferromagnetic particles. The aggregate of the plurality of particles not only includes an aspect in which particles configuring the aggregate directly come into contact with each other, and also includes an aspect in which a binding agent or an additive which will be described later is interposed between the particles. A term "particles" is also used for describing the powder.

As a method of collecting a sample powder from the magnetic tape in order to measure the particle size, a method disclosed in a paragraph of 0015 of JP2011-048878A can be used, for example.

In the invention and the specification, unless otherwise noted, (1) in a case where the shape of the particle observed in the particle image described above is a needle shape, a fusiform shape, or a columnar shape (here, a height is greater than a maximum long diameter of a bottom surface), the size (particle size) of the particles configuring the powder is shown as a length of a long axis configuring the particle, that is, a long axis length, (2) in a case where the shape of the particle is a planar shape or a columnar shape (here, a thickness or a height is smaller than a maximum long diameter of a plate surface or a bottom surface), the particle size is shown as a maximum long diameter of the plate surface or the bottom surface, and (3) in a case where the shape of the particle is a sphere shape, a polyhedron shape, or an unspecified shape, and the long axis configuring the particles cannot be specified from the shape, the particle size is shown as an equivalent circle diameter. The equivalent circle diameter is a value obtained by a circle projection method.

In addition, regarding an average acicular ratio of the powder, a length of a short axis, that is, a short axis length of the particles is measured in the measurement described above, a value of (long axis length/short axis length) of each particle is obtained, and an arithmetical mean of the values obtained regarding 500 particles is calculated. Here, unless otherwise noted, in a case of (1), the short axis length as the definition of the particle size is a length of a short axis configuring the particle, in a case of (2), the short axis length is a thickness or a height, and in a case of (3), the long axis and the short axis are not distinguished, thus, the value of (long axis length/short axis length) is assumed as 1, for convenience.

In addition, unless otherwise noted, in a case where the shape of the particle is specified, for example, in a case of definition of the particle size (1), the average particle size is an average long axis length, in a case of the definition (2), the average particle size is an average plate diameter, and an average plate ratio is an arithmetical mean of (maximum long diameter/thickness or height). In a case of the definition (3), the average particle size is an average diameter (also referred to as an average particle diameter).

The content (filling percentage) of the ferromagnetic powder of the magnetic layer is preferably 50 to 90 mass % and more preferably 60 to 90 mass %. The components other than the ferromagnetic powder of the magnetic layer are at least a binding agent and one or more components selected from the group consisting of fatty acid and fatty acid amide, and one or more kinds of additives may be arbitrarily included. A high filling percentage of the ferromagnetic powder in the magnetic layer is preferable from a viewpoint of improvement recording density.

Binding Agent

The magnetic tape is a coating type magnetic tape, and the magnetic layer includes a binding agent together with the ferromagnetic powder. As the binding agent, one or more kinds of resin is used. The resin may be a homopolymer or a copolymer. As the binding agent, various resins normally used as a binding agent of the coating type magnetic recording medium can be used. For example, as the binding agent, a resin selected from a polyurethane resin, a polyester resin, a polyamide resin, a vinyl chloride resin, an acrylic resin obtained by copolymerizing styrene, acrylonitrile, or methyl methacrylate, a cellulose resin such as nitrocellulose, an epoxy resin, a phenoxy resin, and a polyvinylalkylal resin such as polyvinyl acetal or polyvinyl butyral can be used alone or a plurality of resins can be mixed with each other to be used. Among these, a polyurethane resin, an acrylic resin, a cellulose resin, and a vinyl chloride resin are preferable. These resins can be used as the binding agent even in the non-magnetic layer and/or a back coating layer which will be described later. For the binding agent described above, description disclosed in paragraphs 0028 to 0031 of JP2010-24113A can be referred to. An average molecular weight of the resin used as the binding agent can be, for example, 10,000 to 200,000 as a weight-average molecular weight. The weight-average molecular weight of the invention and the specification is a value obtained by performing polystyrene conversion of a value measured by gel permeation chromatography (GPC). As the measurement conditions, the following conditions can be used. The weight-average molecular weight shown in examples which will be described later is a value obtained by performing polystyrene conversion of a value measured under the following measurement conditions.

GPC device: HLC-8120 (manufactured by Tosoh Corporation)

Column: TSK gel Multipore HXL-M (manufactured by Tosoh Corporation, 7.8 mmID (inner diameter)×30.0 cm)

Eluent: Tetrahydrofuran (THF)

In addition, a curing agent can also be used together with the binding agent. As the curing agent, in one aspect, a thermosetting compound which is a compound in which a curing reaction (crosslinking reaction) proceeds due to heating can be used, and in another aspect, a photocurable compound in which a curing reaction (crosslinking reaction) proceeds due to light irradiation can be used. At least a part of the curing agent is included in the magnetic layer in a state of being reacted (crosslinked) with other components such as the binding agent, by proceeding the curing reaction in the magnetic layer forming step. The preferred curing agent is a thermosetting compound, polyisocyanate is suitable. For details of the polyisocyanate, descriptions disclosed in paragraphs 0124 and 0125 of JP2011-216149A can be referred to, for example. The amount of the curing agent can be, for example, 0 to 80.0 parts by mass with respect to 100.0 parts by mass of the binding agent in the magnetic layer forming composition, and is preferably 50.0 to 80.0 parts by mass, from a viewpoint of improvement of strength of each layer such as the magnetic layer.

Other Components

The magnetic layer may include one or more kinds of additives, if necessary, together with the various components described above. As the additives, a commercially available product can be suitably selected and used according to the desired properties. Alternatively, a compound synthesized by a well-known method can be used as the additives. As the additives, the curing agent described above is used as an example. In addition, examples of the additive which can be included in the magnetic layer include a non-magnetic filler, a lubricant, a dispersing agent, a dispersing assistant, an antifungal agent, an antistatic agent, an antioxidant, and carbon black. The non-magnetic filler is identical to the non-magnetic powder. As the non-magnetic filler, a non-magnetic filler (hereinafter, referred to as a "projection formation agent") which can function as a projection formation agent which forms projections suitably protruded from the surface of the magnetic layer, and a non-magnetic filler (hereinafter, referred to as an "abrasive") which can function as an abrasive can be used.

Non-Magnetic Filler

As the projection formation agent which is one aspect of the non-magnetic filler, various non-magnetic powders normally used as a projection formation agent can be used. These may be inorganic substances or organic substances. In one aspect, from a viewpoint of homogenization of friction properties, particle size distribution of the projection formation agent is not polydispersion having a plurality of peaks in the distribution and is preferably monodisperse showing a single peak. From a viewpoint of availability of monodisperse particles, the projection formation agent is preferably powder of inorganic substances (inorganic powder). Examples of the inorganic powder include powder of inorganic oxide such as metal oxide, metal carbonate, metal sulfate, metal nitride, metal carbide, and metal sulfide, and powder of inorganic oxide is preferable. The projection formation agent is more preferably colloidal particles and even more preferably inorganic oxide colloidal particles. In addition, from a viewpoint of availability of monodisperse particles, the inorganic oxide configuring the inorganic oxide colloidal particles are preferably silicon dioxide (silica). The inorganic oxide colloidal particles are more preferably colloidal silica (silica colloidal particles). In the invention and the specification, the "colloidal particles" are particles which are not precipitated and dispersed to generate a colloidal dispersion, in a case where 1 g of the particles is added to 100 mL of at least one organic solvent of at least methyl ethyl ketone, cyclohexanone, toluene, or ethyl acetate, or a mixed solvent including two or more kinds of the solvent described above at an arbitrary mixing ratio. The average particle size of the colloidal particles is a value obtained by a method disclosed in a paragraph 0015 of JP2011-048878A as a measurement method of an average particle diameter. In addition, in another aspect, the projection formation agent is preferably carbon black.

An average particle size of the projection formation agent is, for example, 30 to 300 nm and is preferably 40 to 200 nm.

The abrasive which is another aspect of the non-magnetic filler is preferably non-magnetic powder having Mohs hardness exceeding 8 and more preferably non-magnetic powder having Mohs hardness equal to or greater than 9. A maximum value of Mohs hardness is 10 of diamond. Specifically, powders of alumina ($Al_2O_3$), silicon carbide, boron carbide ($B_4C$), $SiO_2$, TiC, chromium oxide ($Cr_2O_3$), cerium oxide, zirconium oxide ($ZrO_2$), iron oxide, diamond, and the like can be used, and among these, alumina powder such as α-alumina and silicon carbide powder are preferable. In addition, regarding the particle size of the abrasive, a specific surface area which is an index for the particle size is, for example, equal to or greater than 14 $m^2/g$, and is preferably 16 $m^2/g$ and more preferably 18 $m^2/g$. Further, the specific surface area of the abrasive can be, for example, equal to or smaller than 40 $m^2/g$. The specific surface area is a value obtained by a nitrogen adsorption method (also referred to as a Brunauer-Emmett-Teller (BET) 1 point method), and is a value measured regarding primary particles. Hereinafter, the specific surface area obtained by such a method is also referred to as a BET specific surface area.

In addition, from a viewpoint that the projection formation agent and the abrasive can exhibit the functions thereof in more excellent manner, the content of the projection formation agent of the magnetic layer is preferably 1.0 to 4.0 parts by mass and more preferably 1.5 to 3.5 parts by mass with respect to 100.0 parts by mass of the ferromagnetic powder. Meanwhile, the content of the magnetic layer is preferably 1.0 to 20.0 parts by mass, more preferably 3.0 to 15.0 parts by mass, and even more preferably 4.0 to 10.0 parts by mass with respect to 100.0 parts by mass of the ferromagnetic powder.

As an example of the additive which can be used in the magnetic layer including the abrasive, a dispersing agent disclosed in paragraphs 0012 to 0022 of JP2013-131285A can be used as a dispersing agent for improving dispersibility of the abrasive of the magnetic layer forming composition. It is preferable to improve dispersibility of the magnetic layer forming composition of the non-magnetic filler such as an abrasive, in order to decrease the center line average surface roughness Ra measured regarding the surface of the magnetic layer.

Center Line Average Surface Roughness Ra Measured Regarding Surface of Magnetic Layer Increasing a surface smoothness of the magnetic layer in the magnetic tape causes improvement of electromagnetic conversion characteristics. Regarding the surface smoothness of the magnetic layer, the center line average surface roughness Ra measured regarding the surface of the magnetic layer can be an index. In the invention and the specification, the center line average surface roughness Ra measured regarding the surface of the magnetic layer of the magnetic tape is a value measured with an atomic force microscope (AFM) in a region having an area of 40 μm×40 μm. As an example of the measurement conditions, the following measurement conditions can be used. The center line average surface roughness Ra shown in examples which will be described later is a value obtained by the measurement under the following measurement conditions.

The measurement is performed regarding the region of 40 μm×40 μm of the area of the surface of the magnetic layer of the magnetic tape with an AFM (Nanoscope 4 manufactured by Veeco Instruments, Inc.). A scan speed (probe movement speed) is set as 40 μm/sec and a resolution is set as 512 pixel×512 pixel.

In one aspect, the center line average surface roughness Ra measured regarding the surface of the magnetic layer of the magnetic tape is preferably equal to or smaller than 2.8 nm, more preferably equal to or smaller than 2.5 nm, even more preferably equal to or smaller than 2.3 nm, and still more preferably equal to or smaller than 2.0 nm, from a viewpoint of improving electromagnetic conversion characteristics. However, according to the studies of the inventors, it is found that, in a case where the center line average surface roughness Ra measured regarding the surface of the magnetic layer is equal to or smaller than 2.5 nm and any measures are not prepared, a decrease in electric resistance in the TMR head which slides on the surface of the magnetic layer of the magnetic tape tends to occur even more significantly. However, even a significant decrease in resistance value of the TMR head occurring in a case where the Ra is equal to or smaller than 2.5 nm can be prevented according to the magnetic tape device in which the logarithmic decrement is equal to or smaller than 0.050, for example. In addition, the magnetic tape which easily causes a significant decrease in electric resistance of the TMR head in the magnetic tape device in which the TMR head is mounted as the servo head and/or the reproducing head can be excluded from the magnetic tapes to be shipped as products, based on evaluation result obtained by the evaluation method according to one aspect of the invention.

The center line average surface roughness Ra measured regarding the surface of the magnetic layer can be equal to or greater than 1.2 nm or equal to or greater than 1.3 nm. From a viewpoint of improving electromagnetic conversion characteristics, a low value of the Ra is preferable, and thus, the Ra may be lower than the values described above.

The surface smoothness of the magnetic layer, that is, the center line average surface roughness Ra measured regarding the surface of the magnetic layer can be controlled by a well-known method. For example, the surface smoothness of the magnetic layer can be controlled by adjusting a size of various powder (for example, ferromagnetic powder, non-magnetic filler which may be arbitrarily included, and the like) included in the magnetic layer or manufacturing conditions of the magnetic tape.

Non-Magnetic Layer

Next, the non-magnetic layer will be described. The magnetic tape may include a magnetic layer directly on a non-magnetic support, or may include a non-magnetic layer including non-magnetic powder and a binding agent between the non-magnetic support and the magnetic layer. The non-magnetic powder used in the non-magnetic layer may be powder of inorganic substances or powder of organic substances. In addition, carbon black and the like can be used. Examples of the inorganic substances include metal, metal oxide, metal carbonate, metal sulfate, metal nitride, metal carbide, and metal sulfide. These non-magnetic powder can be purchased as a commercially available product or can be manufactured by a well-known method. For details thereof, descriptions disclosed in paragraphs 0146 to 0150 of JP2011-216149A can be referred to. For carbon black which can be used in the non-magnetic layer, descriptions disclosed in paragraphs 0040 and 0041 of JP2010-24113A can be referred to. The content (filling percentage) of the non-magnetic powder of the non-magnetic layer is preferably 50 to 90 mass % and more preferably 60 to 90 mass %.

In regards to other details of a binding agent or additives of the non-magnetic layer, the well-known technology regarding the non-magnetic layer can be applied. In addition, in regards to the type and the content of the binding agent, and the type and the content of the additive, for example, the well-known technology regarding the magnetic layer can be applied.

The non-magnetic layer of the magnetic tape also includes a substantially non-magnetic layer including a small amount of ferromagnetic powder as impurities or intentionally, together with the non-magnetic powder. Here, the substantially non-magnetic layer is a layer having a residual magnetic flux density equal to or smaller than 10 mT, a layer having coercivity equal to or smaller than 7.96 kA/m(100 Oe), or a layer having a residual magnetic flux density equal to or smaller than 10 mT and coercivity equal to or smaller than 7.96 kA/m(100 Oe). It is preferable that the non-magnetic layer does not have a residual magnetic flux density and coercivity.

Non-Magnetic Support

Next, the non-magnetic support will be described. As the non-magnetic support (hereinafter, also simply referred to as a "support"), well-known components such as polyethylene terephthalate, polyethylene naphthalate, polyamide, polyamide imide, aromatic polyamide subjected to biaxial stretching are used. Among these, polyethylene terephthalate, polyethylene naphthalate, and polyamide are preferable. Corona discharge, plasma treatment, easy-bonding treatment, or heating treatment may be performed with respect to these supports in advance.

Back Coating Layer

The magnetic tape can also include a back coating layer including non-magnetic powder and a binding agent on a surface side of the non-magnetic support opposite to the surface provided with the magnetic layer. The back coating layer preferably includes any one or both of carbon black and inorganic powder. In regards to the binding agent included in the back coating layer and various additives which can be arbitrarily included in the back coating layer, a well-known technology regarding the treatment of the magnetic layer and/or the non-magnetic layer can be applied.

Various Thickness

A thickness of the non-magnetic support is preferably 3.0 to 6.0 μm.

A thickness of the magnetic layer is preferably equal to or smaller than 0.15 μm and more preferably equal to or smaller than 0.1 μm, from a viewpoint of realization of high-density recording required in recent years. The thickness of the magnetic layer is even more preferably 0.01 to 0.1 μm. The magnetic layer may be at least single layer, the magnetic layer may be separated into two or more layers having different magnetic properties, and a configuration of a well-known multilayered magnetic layer can be applied. A thickness of the magnetic layer in a case where the magnetic layer is separated into two or more layers is a total thickness of the layers.

A thickness of the non-magnetic layer is, for example, 0.1 to 1.5 μm and is preferably 0.1 to 1.0 μm.

Meanwhile, the magnetic tape is normally used to be accommodated and circulated in a magnetic tape cartridge. In order to increase recording capacity for 1 reel of the magnetic tape cartridge, it is desired to increase a total length of the magnetic tape accommodated in 1 reel of the magnetic tape cartridge. In order to increase the recording capacity, it is necessary that the magnetic tape is thinned (hereinafter, referred to as "thinning"). As one method of thinning the magnetic tape, a method of decreasing a total thickness of a magnetic layer and a non-magnetic layer of a magnetic tape including the non-magnetic layer and the magnetic layer on a non-magnetic support in this order is used. In a case where the magnetic tape includes a non-magnetic layer, the total thickness of the magnetic layer and the non-magnetic layer is preferably equal to or smaller than 1.8 μm, more preferably equal to or smaller than 1.5 μm, and even more preferably equal to or smaller than 1.1 μm, from a viewpoint of thinning the magnetic tape. According to the studies of the inventors, it is found that, in a case where the total thickness of the magnetic layer and the non-magnetic layer is equal to or smaller than 1.1 μm and any measures are not prepared, a decrease in electric resistance tends to occur even more significantly in the TMR head which slides on the surface of the magnetic layer of the magnetic tape. However, even a significant decrease in electric resistance of the TMR head occurring in a case where the total thickness of the magnetic layer and the non-magnetic layer is equal to or smaller than 1.1 μm can be prevented according to the magnetic tape device in which the logarithmic decrement is equal to or smaller than 0.050, for example. In addition, the magnetic tape which easily causes a significant decrease in electric resistance of the TMR head in the magnetic tape device in which the TMR head is mounted as the servo head and/or the reproducing head can be excluded from the magnetic tapes to be shipped as products, based on evaluation result obtained by the evaluation method according to one aspect of the invention.

The total thickness of the magnetic layer and the non-magnetic layer can be, for example, equal to or greater than 0.1 μm or equal to or greater than 0.2 μm.

A thickness of the back coating layer is preferably equal to or smaller than 0.9 μm and even more preferably 0.1 to 0.7 μm.

The thicknesses of various layers of the magnetic tape and the non-magnetic support can be acquired by a well-known film thickness measurement method. As an example, a cross section of the magnetic tape in a thickness direction is, for example, exposed by a well-known method of ion beams or microtome, and the exposed cross section is observed with a scan electron microscope. In the cross section observation, various thicknesses can be acquired as a thickness acquired at one position of the cross section in the thickness direction, or an arithmetical mean of thicknesses acquired at a plurality of positions of two or more positions, for example, two positions which are arbitrarily extracted. In addition, the thickness of each layer may be acquired as a designed thickness calculated according to the manufacturing conditions.

Manufacturing Method

Preparation of Each Layer Forming Composition

Each composition for forming the magnetic layer, the non-magnetic layer, or the back coating layer normally includes a solvent, together with various components described above. As the solvent, various organic solvents generally used for manufacturing a coating type magnetic recording medium can be used. Among those, from a viewpoint of solubility of the binding agent normally used in the coating type magnetic recording medium, each layer forming composition preferably includes one or more ketone solvents such as acetone, methyl ethyl ketone, methyl isobutyl ketone, diisobutyl ketone, cyclohexanone, isophorone, and tetrahydrofuran. The amount of the solvent of each layer forming composition is not particularly limited, and can be set to be the same as that of each layer forming composition of a typical coating type magnetic recording medium. In addition, steps of preparing each layer forming composition generally include at least a kneading step, a dispersing step, and a mixing step provided before and after these steps, if necessary. Each step may be divided into two or more stages. All of raw materials used in the invention may be added at an initial stage or in a middle stage of each step. In addition, each raw material may be separately added in two or more steps. For example, a binding agent may be separately added in a kneading step, a dispersing step, and a mixing step for adjusting viscosity after the dispersion. In a manufacturing step of the magnetic tape, a well-known manufacturing technology of the related art can be used in a part of the step or in the entire step. In the kneading step, an open kneader, a continuous kneader, a pressure kneader, or a kneader having a strong kneading force such as an extruder is preferably used. The details of the kneading processes of these kneaders are disclosed in JP1989-106338A (JP-H01-106338A) and JP1989-79274A (JP-H01-79274A). In addition, in order to disperse each layer forming composition, glass beads and/or other beads can be used. As such dispersion beads, zirconia beads, titania beads, and steel beads which are dispersion beads having high specific gravity are preferable. These dispersion beads are preferably used by optimizing a bead diameter and a filling percentage. As a dispersing machine, a well-known dispersing machine can be used.

Coating Step, Cooling Step, Heating and Drying Step, Burnishing Treatment Step, and Curing Step The magnetic layer can be formed by directly applying the magnetic layer forming composition onto the non-magnetic support or performing multilayer coating of the magnetic layer forming composition with the non-magnetic layer forming composition in order or at the same time. For details of the coating for forming each layer, a description disclosed in a paragraph 0066 of JP2010-231843A can be referred to.

In a preferred aspect, a magnetic layer can be formed through a magnetic layer forming step including a coating step of applying a magnetic layer forming composition including ferromagnetic powder, a binding agent, a curing agent, and a solvent onto a non-magnetic support directly or with another layer interposed therebetween, to form a coating layer, a heating and drying step of drying the coating layer by a heating process, and a curing step of performing a curing process with respect to the coating layer. The magnetic layer forming step preferably includes a cooling step of cooling the coating layer between the coating step and the heating and drying step, and more preferably includes a burnishing treatment step of performing a burnishing treatment with respect to the surface of the coating layer between the heating and drying step and the curing step.

The inventors have thought that it is preferable that the cooling step and the burnishing treatment step in the magnetic layer forming step, in order to set the logarithmic decrement to be equal to or smaller than 0.050. More specific description is as follows.

The inventors have surmised that performing the cooling step of cooling the coating layer between the coating step and the heating and drying step contributes to causing pressure sensitive adhesive component separated from the magnetic tape (specifically, surface of the magnetic layer) in a case where the TMR head comes into contact with and slides on the magnetic tape, to be localized in the surface and/or a surface layer part in the vicinity of the surface of the coating layer. The inventors have surmised that this is because the pressure sensitive adhesive component at the time of solvent volatilization in the heating and drying step is easily moved to the surface and/or the surface layer part of the coating layer, by cooling the coating layer of the magnetic layer forming composition before the heating and drying step. However, the reason thereof is not clear. In addition, the inventors have thought that the pressure sensitive adhesive component can be removed by performing the burnishing treatment with respect to the surface of the coating layer in which the pressure sensitive adhesive component is localized on the surface and/or surface layer part. The inventors have surmised that performing the curing step after removing the pressure sensitive adhesive component contributes setting the logarithmic decrement to be equal to or smaller than 0.050. However, this is merely a surmise, and the invention is not limited thereto.

As described above, multilayer coating of the magnetic layer forming composition can be performed with the non-magnetic layer forming composition in order or at the same time. In a preferred aspect, the magnetic tape can be manufactured by successive multilayer coating. A manufacturing step including the successive multilayer coating can be preferably performed as follows. The non-magnetic layer is formed through a coating step of applying a non-magnetic layer forming composition onto a non-magnetic support to form a coating layer, and a heating and drying step of drying the formed coating layer by a heating process. In addition, the magnetic layer is formed through a coating step of applying a magnetic layer forming composition onto the formed non-magnetic layer to form a coating layer, and a heating and drying step of drying the formed coating layer by a heating process.

Hereinafter, a specific aspect of the manufacturing method of the magnetic tape will be described with reference to FIG. 4. However, the invention is not limited to the following specific aspect.

FIG. 4 is a step schematic view showing a specific aspect of a step of manufacturing the magnetic tape including a non-magnetic layer and a magnetic layer in this order on one surface of a non-magnetic support and including a back coating layer on the other surface thereof. In the aspect shown in FIG. 4, an operation of sending a non-magnetic support (elongated film) from a sending part and winding the non-magnetic support around a winding part is continuously performed, and various processes of coating, drying, and orientation are performed in each part or each zone shown in FIG. 4, and thus, it is possible to sequentially form a non-magnetic layer and a magnetic layer on one surface of the running non-magnetic support by multilayer coating and to form a back coating layer on the other surface thereof. Such a manufacturing method can be set to be identical to the manufacturing method normally performed for manufacturing a coating type magnetic recording medium, except for including a cooling zone in the magnetic layer forming step and including the burnishing treatment step before the curing process.

The non-magnetic layer forming composition is applied onto the non-magnetic support sent from the sending part in a first coating part (coating step of non-magnetic layer forming composition).

After the coating step, in a first heating process zone, the coating layer of the non-magnetic layer forming composition formed in the coating step is heated after to dry the coating layer (heating and drying step). The heating and drying step can be performed by causing the non-magnetic support including the coating layer of the non-magnetic layer forming composition to pass through the heated atmosphere. An atmosphere temperature of the heated atmosphere here can be, for example, approximately 60° to 140°. Here, the atmosphere temperature may be a temperature at which the solvent is volatilized and the coating layer is dried, and the atmosphere temperature is not limited to the range described above. In addition, the heated air may blow to the surface of the coating layer. The points described above are also applied to a heating and drying step of a second heating process zone and a heating and drying step of a third heating process zone which will be described later, in the same manner.

Next, in a second coating part, the magnetic layer forming composition is applied onto the non-magnetic layer formed by performing the heating and drying step in the first heating process zone (coating step of magnetic layer forming composition).

After the coating step, a coating layer of the magnetic layer forming composition formed in the coating step is cooled in a cooling zone (cooling step). For example, it is possible to perform the cooling step by allowing the non-magnetic support on which the coating layer is formed on the non-magnetic layer to pass through a cooling atmosphere. An atmosphere temperature of the cooling atmosphere is preferably −10° C. to 0° C. and more preferably −5° C. to 0° C. The time for performing the cooling step (for example, time while an arbitrary part of the coating layer is delivered to and sent from the cooling zone (hereinafter, also referred to as a "staying time")) is not particularly limited. In a case where the staying time is long, the value of logarithmic decrement tends to be increased. Thus, the staying time is preferably adjusted by performing preliminary experiment if necessary, so that the logarithmic decrement equal to or smaller than 0.050 is realized. In the cooling step, cooled air may blow to the surface of the coating layer.

After that, while the coating layer of the magnetic layer forming composition is wet, an orientation process of the ferromagnetic powder in the coating layer is performed in an orientation zone. For the orientation process, a description disclosed in a paragraph 0067 of JP2010-231843A can be referred to.

The coating layer after the orientation process is subjected to the heating and drying step in the second heating process zone.

Next, in the third coating part, a back coating layer forming composition is applied to a surface of the non-magnetic support on a side opposite to the surface where the non-magnetic layer and the magnetic layer are formed, to form a coating layer (coating step of back coating layer forming composition). After that, the coating layer is heated and dried in the third heating process zone.

By doing so, it is possible to obtain the magnetic tape including the coating layer of the magnetic layer forming composition heated and dried on the non-magnetic layer, on one surface side of the non-magnetic support, and the back coating layer on the other surface side thereof. The magnetic tape obtained here becomes a magnetic tape product after performing various processes which will be described later.

The obtained magnetic tape is wound around the winding part, and cut (slit) to have a size of a magnetic tape product. The slitting is performed by using a well-known cutter.

In the slit magnetic tape, the burnishing treatment is performed with respect to the surface of the heated and dried coating layer of the magnetic layer forming composition, before performing the curing process (heating and light irradiation) in accordance with the types of the curing agent included in the magnetic layer forming composition (burnishing treatment step between heating and drying step and curing step). The inventors have surmised that removing the pressure sensitive adhesive component transitioned to the surface and/or the surface layer part of the coating layer cooled in the cooling zone by the burnishing treatment contributes setting the logarithmic decrement to be equal to or smaller than 0.050. However, as described above, this is merely a surmise, and the invention is not limited thereto.

The burnishing treatment is treatment of rubbing a surface of a treatment target with a member (for example, a polishing tape, or a grinding tool such as a grinding blade or a grinding wheel), and can be performed in the same manner as the well-known burnishing treatment for manufacturing a coating type magnetic recording medium. However, in the related art, the burnishing treatment was not performed in a stage before the curing step, after performing the cooling step and the heating and drying step. With respect to this, the logarithmic decrement can be equal to or smaller than 0.050 by performing the burnishing treatment in the stage described above. This point was newly found by the inventors.

The burnishing treatment can be preferably performed by performing one or both of rubbing of the surface of the coating layer of the treatment target by a polishing tape (polishing) and rubbing of the surface of the coating layer of the treatment target by a grinding tool (grinding). In a case where the magnetic layer forming composition includes an abrasive, it is preferable to use a polishing tape including at least one of an abrasive having higher Mohs hardness than that of the abrasive described above. As the polishing tape, a commercially available product may be used and a polishing tape manufactured by a well-known method may be used. As the grinding tool, a well-known blade such as a fixed blade, a diamond wheel, or a rotary blade, or a grinding blade can be used. In addition, a wiping treatment of wiping the surface of the coating layer rubbed by the polishing tape and/or the grinding tool with a wiping material. For details of preferred polishing tape, grinding tool, burnishing treatment, and wiping treatment, descriptions disclosed in paragraphs 0034 to 0048, FIG. 1 and examples of JP1994-52544A (JP-H06-52544A) can be referred to. As the burnishing treatment is reinforced, the value of the logarithmic decrement tends to be decreased. The burnishing treatment can be reinforced as an abrasive having high hardness is used as the abrasive included in the polishing tape, and can be reinforced, as the amount of the abrasive in the polishing tape is increased. In addition, the burnishing treatment can be reinforced as a grinding tool having high hardness is used as the grinding tool. In regards to the burnishing treatment conditions, the burnishing treatment can be reinforced as a sliding speed between the surface of the coating layer of the treatment target and a member (for example, a polishing tape or a grinding tool) is increased. The sliding speed can be increased by increasing one or both of a speed at which the member is moved, and a speed at which the magnetic tape of the treatment target is moved.

After the burnishing treatment (burnishing treatment step), the curing process is performed with respect to the coating layer of the magnetic layer forming composition. In the aspect shown in FIG. 4, the coating layer of the magnetic layer forming composition is subjected to the surface smoothing treatment, after the burnishing treatment and before the curing process. The surface smoothing treatment is preferably performed by a calender process. For details of the calender process, for example, description disclosed in a paragraph 0026 of JP2010-231843A can be referred to. As the calender process is reinforced, the surface of the magnetic tape can be smoothened. The calender process is reinforced, as the surface temperature (calender temperature) of a calender roll is increased and/or as calender pressure is increased.

After that, the curing process according to the type of the curing agent included in the coating layer is performed with respect to the coating layer of the magnetic layer forming composition (curing step). The curing process can be performed by the process according to the type of the curing agent included in the coating layer, such as a heating process or light irradiation. The curing process conditions are not particularly limited, and the curing process conditions may be suitably set in accordance with the list of the magnetic layer forming composition used in the coating layer formation, the type of the curing agent, and the thickness of the coating layer. For example, in a case where the coating layer is formed by using the magnetic layer forming composition including polyisocyanate as the curing agent, the curing process is preferably the heating process. In a case where the curing agent is included in a layer other than the magnetic layer, a curing reaction of the layer can also be promoted by the curing process here. Alternatively, the curing step may be separately provided. After the curing step, the burnishing treatment may be further performed.

As described above, it is possible to obtain a magnetic tape having logarithmic decrement equal to or smaller than 0.050 which is acquired by a pendulum viscoelasticity test performed regarding the surface of the magnetic layer of the magnetic tape. However, the manufacturing method described above is merely an example and the logarithmic decrement equal to or smaller than 0.050 can be realized by an arbitrary method capable of adjusting the logarithmic decrement.

Formation of Servo Pattern

Regarding the servo pattern formed in the magnetic layer and the formation of the servo pattern, the above description regarding the magnetic tape which is the evaluation target of the evaluation method can be referred to.

Evaluation of the Magnetic Tape

The prepared magnetic tape is evaluated by the evaluation method according to one aspect of the invention. The details of such evaluation are as described above.

Determination of Magnetic Tape to be Shipped as Product

In the manufacturing method, the determination whether or not the prepared magnetic tape is a magnetic tape to be shipped as a tape product is performed by assuming the determination as a good product by performing the quality determination by the evaluation as one determination criterion. In one aspect, it is possible to determine that the prepared magnetic tape is a magnetic tape to be shipped as a product in accordance with only the determination criterion. In another aspect, it is possible to determine that the prepared magnetic tape is a magnetic tape to be shipped as a product in accordance with two or more determination criteria including one or more of other determination criteria. One or more of other determination criteria are not particularly limited, and determination criteria based on the evaluation result obtained by various well-known evaluation methods as the pre-shipment inspection of the magnetic tape can be used. As an example of the determination criteria, a criterion that the quality of the servo pattern read by the TMR head is on an acceptable level (for example, the servo pattern is written at a predetermined accuracy) can be used. Regarding the quality evaluation of the servo pattern, descriptions disclosed in paragraphs 0007 to 0025 of JP2006-92585A can be referred to, for example. However, there is no limitation thereto. One or more of other determination criteria are not limited to the criterion that the quality of the servo pattern is on the acceptable level.

Pre-Shipment Step

By doing so, the magnetic tape determined as a magnetic tape to be shipped as a product is subjected to the pre-shipment step for shipping the magnetic tape as a product. As the pre-shipment step, various well-known steps in the field of manufacturing of the magnetic tape can be used. For example, in a case where the magnetic tape subjected to the evaluation is in a state before being accommodated in the magnetic tape cartridge, a step of accommodating the magnetic tape in the magnetic tape cartridge can be used as an example of the pre-shipment step. In addition, a step of packing the magnetic tape cartridge can also be used as an example of the pre-shipment step. However, the pre-shipment step is not limited to the steps exemplified here.

According to the manufacturing method of the magnetic tape according to one aspect of the invention described above, it is possible to stably supply magnetic tapes usable without causing a significant decrease in electric resistance of the TMR head in the magnetic tape device in which the TMR head is mounted as the reproducing head and/or the servo head, to the market. Therefore, the magnetic tape manufactured by the manufacturing method of the magnetic tape according to one aspect of the invention can be suitably used in the magnetic tape device in which the TMR head is mounted as the reproducing head and/or the servo head. Meanwhile, the magnetic tape manufactured by the manufacturing method of the magnetic tape according to one aspect of the invention can also be used in a magnetic tape device other than the magnetic tape device in which the TMR head is mounted as the reproducing head and/or the servo head.

EXAMPLES

Hereinafter, the invention will be described with reference to examples. However, the invention is not limited to aspects shown in the examples. "Parts" and "%" in the following description mean "parts by mass" and "mass %", unless otherwise noted.

Evaluation Example 1-1

1. Manufacturing of Magnetic Tape
(1) Preparation of Alumina Dispersion 3.0 parts of 2,3-dihydroxynaphthalene (manufactured by Tokyo Chemical Industry Co., Ltd.), 31.3 parts of a 32% solution (solvent is a mixed solvent of methyl ethyl ketone and toluene) of a polyester polyurethane resin having a $SO_3Na$ group as a polar group (UR-4800 (amount of a polar group: 80 meq/kg) manufactured by Toyobo Co., Ltd.), and 570.0 parts of a mixed solution of methyl ethyl ketone and cyclohexanone (mass ratio of 1:1) as a solvent were mixed in 100.0 parts of alumina powder (HIT-80 manufactured by Sumitomo Chemical Co., Ltd.) having an gelatinization ratio of 65% and a BET specific surface area of 20 $m^2/g$, and dispersed in the presence of zirconia beads by a paint shaker for 5 hours. After the dispersion, the dispersion liquid and the beads were separated by a mesh and an alumina dispersion was obtained.

(2) Magnetic Layer Forming Composition List
Magnetic Solution
Ferromagnetic hexagonal barium ferrite powder: 100.0 parts
  Average particle size (average plate diameter): 21 nm
  $SO_3Na$ group-containing polyurethane resin: 14.0 parts
  Weight-average molecular weight: 70,000, $SO_3Na$ group: 0.2 meq/g
  Cyclohexanone: 150.0 parts
  Methyl ethyl ketone: 150.0 parts
Abrasive Liquid
  Alumina dispersion prepared in the section (1): 6.0 parts
Silica Sol
  Colloidal silica: 2.0 parts
  Average particle size: see Table 1
  Methyl ethyl ketone: 1.4 parts
Other Components
  Stearic acid: 2.0 parts
  Stearic acid amide: 0.2 parts
  Butyl stearate: 2.0 parts
  Polyisocyanate (CORONATE (registered trademark) L manufactured by Nippon Polyurethane Industry Co., Ltd.): 2.5 parts
Finishing Additive Solvent
  Cyclohexanone: 200.0 parts
  Methyl ethyl ketone: 200.0 parts
(3) Non-Magnetic Layer Forming Composition List
  Non-magnetic inorganic powder: α-iron oxide: 100.0 parts
  Average particle size (average long axis length): 0.15 μm
  Average acicular ratio: 7
  BET specific surface area: 52 $m^2/g$
  Carbon black: 20.0 parts
  Average particle size: 20 nm
  A vinyl chloride copolymer: 13.0 parts
  $SO_3Na$ group-containing polyurethane resin: 9.0 parts
  Weight-average molecular weight: 70,000, $SO_3Na$ group: 0.2 meq/g
  Phenylphosphonic acid: 3.0 parts
  Stearic acid: 2.0 parts
  Stearic acid amide: 0.2 parts
  Butyl stearate: 2.0 parts
  Cyclohexanone: 300.0 parts
  Methyl ethyl ketone: 300.0 parts
(4) Back Coating Layer Forming Composition List
  Non-magnetic inorganic powder: α-iron oxide: 80.0 parts
  Average particle size (average long axis length): 0.15 μm
  Average acicular ratio: 7
  BET specific surface area: 52 $m^2/g$
  Carbon black: 20.0 parts
  Average particle size: 20 nm
  A vinyl chloride copolymer: 13.0 parts
  $SO_3Na$ group-containing polyurethane resin: 6.0 parts
  Phenylphosphonic acid: 3.0 parts
  Methyl ethyl ketone: 155.0 parts
  Stearic acid: 3.0 parts
  Butyl stearate: 3.0 parts
  Polyisocyanate: 5.0 parts
  Cyclohexanone: 355.0 parts
(5) Preparation of Each Layer Forming Composition The magnetic layer forming composition was prepared by the following method. The magnetic solution was prepared by dispersing (beads-dispersing) each component with a batch type vertical sand mill for 24 hours. As the dispersion beads, zirconia beads having a bead diameter of 0.1 mm were used. The prepared magnetic solution and the abrasive liquid were mixed with other components (silica sol, other components, and finishing additive solvent) and beads-dispersed for 5 minutes by using the sand mill, and a process (ultrasonic dispersion) was performed with a batch type ultrasonic device (20 kHz, 300 W) for 0.5 minutes. After that, the filtering was performed by using a filter having an average hole diameter of 0.5 μm, and the magnetic layer forming composition was prepared.

The non-magnetic layer forming composition was prepared by the following method. Each component excluding a lubricant (stearic acid, stearic acid amide, and butyl stearate), cyclohexanone, and methyl ethyl ketone was dispersed by using batch type vertical sand mill for 24 hours to obtain a dispersion liquid. As the dispersion beads, zirconia beads having a bead diameter of 0.1 mm were used. After that, the remaining components were added into the obtained dispersion liquid and stirred with a dissolver. The dispersion liquid obtained as described above was filtered with a filter having an average hole diameter of 0.5 μm and a non-magnetic layer forming composition was prepared.

The back coating layer forming composition was prepared by the following method. Each component excluding lubricant (stearic acid and butyl stearate), polyisocyanate, and cyclohexanone was kneaded and diluted by an open kneader, and subjected to a dispersion process of 12 passes, with a transverse beads mill dispersing device and zirconia beads having a bead diameter of 1 mm, by setting a bead filling percentage as 80 volume %, a circumferential speed of rotor distal end as 10 m/sec, and a retention time for 1 pass as 2 minutes. After that, the remaining components were added into the obtained dispersion liquid and stirred with a dissolver. The dispersion liquid obtained as described above was filtered with a filter having an average hole diameter of 1 μm and a back coating layer forming composition was prepared.

(6) Manufacturing Method of Magnetic Tape

A magnetic tape was manufactured by the specific aspect shown in FIG. 4. The magnetic tape was specifically manufactured as follows.

A support made of polyethylene naphthalate having a thickness of 5.0 μm was sent from the sending part, and the non-magnetic layer forming composition prepared in the section (5) was applied to one surface thereof so that the thickness after the drying becomes a thickness shown in Table 1 in the first coating part and was dried in the first heating process zone (atmosphere temperature of 100° C.) to form a coating layer.

Then, the magnetic layer forming composition prepared in the section (5) was applied onto the non-magnetic layer so that the thickness after the drying becomes the thickness shown in Table 1 in the second coating part, and a coating layer was formed. The cooling step was performed by passing the formed coating layer through the cooling zone in which the atmosphere temperature is adjusted to 0° C. for the staying time shown in Table 1 while the coating layer is wet, a homeotropic alignment process was performed in the orientation zone by applying a magnetic field having a magnetic field strength of 0.3 T in a vertical direction, and then, the coating layer was dried in the second heating process zone (atmosphere temperature of 100° C.).

After that, in the third coating part, the back coating layer forming composition prepared in the section (5) was applied to the surface of the support made of polyethylene naphthalate on a side opposite to the surface where the non-magnetic layer and the magnetic layer are formed, so that the thickness after the drying becomes 0.5 μm, to form a coating layer, and the formed coating layer was dried in the third heating process zone (atmosphere temperature of 100° C.).

The magnetic tape obtained as described above was slit to have a width of ½ inches (0.0127 meters), and the burnishing treatment and the wiping treatment were performed with respect to the surface of the coating layer of the magnetic layer forming composition. The burnishing treatment and the wiping treatment were performed by using a commercially available polishing tape (product name: MA22000 manufactured by Fujifilm Corporation, abrasive: diamond/$Cr_2O_3$/red oxide) as the polishing tape, a commercially available sapphire blade (manufactured by Kyocera Corporation, a width of 5 mm, a length of 35 mm, and a tip angle of 60 degrees) as the grinding blade, and a commercially available wiping material (product name: WRP736 manufactured by Kuraray Co., Ltd.) as the wiping material, in a treatment device having a configuration disclosed in FIG. 1 of JP1994-52544A (JP-H06-52544A). For the treatment conditions, the treatment conditions disclosed in Example 12 of JP1994-52544A (JP-H06-52544A).

After the burnishing treatment and the wiping treatment, a calender process (surface smoothing treatment) was performed with a calender roll configured of only a metal roll, at a speed of 80 m/min, linear pressure of 300 kg/cm (294 kN/m), and a calender temperature (surface temperature of a calender roll) shown in Table 1.

After that, a curing process (heating process) was performed in the environment of the atmosphere temperature of 70° C. for 36 hours, and then, a magnetic tape for forming a servo pattern on the magnetic layer was manufactured.

In a state where the magnetic layer of the manufactured magnetic tape was demagnetized, servo patterns having disposition and shapes according to the Linear-Tape-Open (LTO) Ultrium format were formed on the magnetic layer by using a servo write head mounted on a servo tester. Accordingly, a magnetic tape including data bands, servo bands, and guide bands in the disposition according to the LTO Ultrium format in the magnetic layer, and including servo patterns having the disposition and the shape according to the LTO Ultrium format on the servo band is manufactured. The servo tester includes a servo write head and a servo head. This servo tester was also used in evaluations which will be described later.

The thickness of each layer of the manufactured magnetic tape is acquired by the following method. It was confirmed that the thicknesses of the formed non-magnetic layer and the magnetic layer were the thicknesses shown in Table 1 and the thicknesses of the back coating layer and the non-magnetic support were the thicknesses described above.

A cross section of the magnetic tape in a thickness direction was exposed to ion beams and the exposed cross section was observed with a scanning electron microscope. Various thicknesses were obtained as an arithmetical mean of thicknesses obtained at two portions in the thickness direction in the cross section observation.

A part of the magnetic tape manufactured by the method described above was used in the evaluation described below, and the other part was used in order to measure a resistance value of the TMR head which will be described later.

2. Evaluation of Physical Properties of Magnetic Tape (1) Center Line Average Surface Roughness Ra Measured Regarding Surface of Magnetic Layer The measurement regarding a measurement area of 40 μm×40 μm in the surface of the magnetic layer of the magnetic tape was performed with an atomic force microscope (AFM, Nanoscope 4 manufactured by Veeco Instruments, Inc.), and a center line average surface roughness Ra was acquired. A scan speed (probe movement speed) was set as 40 μm/sec and a resolution was set as 512 pixel×512 pixel.

(2) Measurement of Logarithmic Decrement

The logarithmic decrement of the surface of the magnetic layer of the magnetic tape was acquired by the method described above by using a rigid-body pendulum type physical properties testing instrument RPT-3000W manufactured by A&D Company, Limited (pendulum: brass, substrate: glass substrate, a rate of temperature increase of substrate: 5° C./min) as the measurement device. A measurement sample cut out from the magnetic tape was placed on a glass substrate having a size of approximately 3 cm×approximately 5 cm, by being fixed at 4 portions with a fixing tape (Kapton tape manufactured by Du Pont-Toray Co., Ltd.) as shown in FIG. 1. An adsorption time was set as 1 second, a measurement interval was set as 7 to 10 seconds, a displacement-time curve was drawn regarding the 86-th measurement interval, and the logarithmic decrement was acquired by using this curve. The measurement was performed in the environment of relative humidity of approximately 50%.

3. Measurement of Electric Resistance of Servo Pattern Reading Element of Head for Evaluation A TMR head (element width of 70 nm) commercially available as a reproducing head for HDD was prepared as a head for evaluation. This head for evaluation (TMR head) was replaced with the servo head of the servo tester. The magnetic tape manufactured in the section 1. was transported in this servo tester while bringing the surface of the magnetic layer into contact with the head for evaluation to cause the surface of the magnetic layer slide thereon. A tape length of the magnetic tape was 1,000 m, and a total of 4,000 passes of the transportation (running) of the magnetic tape was performed by setting the magnetic tape transportation speed (relative speed of the magnetic tape and the head for evaluation) at the time of reproducing as 4 m/sec. The head for evaluation was moved in a width direction of the magnetic tape by 2.5 μm for 1 pass, electric resistance of the servo pattern reading element in the head for evaluation for transportation of 400 passes was measured, and a rate of a decrease in electric resistance with respect to an initial value (resistance value at 0 pass) was obtained by the following equation.

Rate of decrease in electric resistance (%)=[(initial value−electric resistance after transportation of 400 passes)/initial value]×100

The measurement of the electric resistance was performed by bringing an electric resistance measuring device (digital multi-meter (product number: DA-50C) manufactured by Sanwa Electric Instrument Co., Ltd.) into contact with a wiring connecting two electrodes of the servo pattern reading element (TMR element of the TMR head) included in the head for evaluation. In a case where the calculated rate of a decrease in electric resistance was equal to or greater than 30%, it was determined that a significant decrease in electric resistance occurred. Then, the head for evaluation was replaced with a new head for evaluation, and transportation after 400 passes was performed and electric resistance was measured. In the running of 4,000 passes, in a case where the rate of a decrease in electric resistance did not become equal to or greater than 30%, the number of times of occurrence of a decrease in electric resistance was set as 0. The quality determination of the magnetic tape was performed by assuming that the number of times of occurrence of a decrease in electric resistance is 0 as the determination criterion of a good product. In a case where the number of times of occurrence of a decrease in resistance value is 0, the maximum value of the measured rate of a decrease in electric resistance is shown in Table 1.

Evaluation Examples 1-2 to 1-6 and Evaluation Examples 2-1 to 2-11

1. Manufacturing of Magnetic Tape

A magnetic tape was manufactured in the same manner as in Evaluation Example 1-1, except that various conditions shown in Table 1 were changed as shown in Table 1.

In Table 1, in the evaluation examples in which "not performed" is disclosed in a column of the cooling zone staying time, a magnetic tape was manufactured by a manufacturing step not including the cooling zone.

In Table 1, in the evaluation examples in which "not performed" is disclosed in a column of the burnishing treatment before the curing process, a magnetic tape was manufactured by a manufacturing step of not performing the burnishing treatment and the subsequent wiping treatment in the step before performing the curing process.

By performing the steps described above, each magnetic tape to be measured in Evaluation Examples 1-2 to 1-6 and Evaluation Examples 2-1 to 2-11 was manufactured.

2. Evaluation of Physical Properties of Magnetic Tape

Various physical properties of the manufactured magnetic tape were evaluated in the same manner as in Evaluation Example 1-1.

3. Measurement of Electric Resistance of Servo Pattern Reading Element of Head for Evaluation The electric resistance of the servo pattern reading element of the head for evaluation was measured by the same method as that in Evaluation Example 1-1 by using the manufactured magnetic tape. In Evaluation Examples 1-2 to 1-6 and Evaluation Examples 2-6 to 2-11, the TMR head which was the same as that in Evaluation Example 1-1 was used as a head for evaluation. In Evaluation Examples 2-1 to 2-5, a commercially available spin valve type GMR head (element width of 70 nm) was used as a head for evaluation. This GMR head was a magnetic head having a CIP structure including two electrodes with an MR element interposed therebetween in a direction orthogonal to the transportation direction of the magnetic tape. A resistance value was measured in the same manner as in Evaluation Example 1-1 by bringing an electric resistance measuring device into contact with a wiring connecting these two electrodes.

The results of the evaluations described above are shown in Table 1.

TABLE 1

| | Evaluation Example 1-1 | Evaluation Example 1-2 | Evaluation Example 1-3 | Evaluation Example 1-4 | Evaluation Example 1-5 | Evaluation Example 1-6 |
|---|---|---|---|---|---|---|
| Magnetic layer thickness | 0.1 μm | 0.1 μm | 0.1 μm | 0.1 μm | 0.1 μm | 0.1 μm |
| Non-magnetic layer thickness | 1.5 μm | 1.0 μm | 1.0 μm | 0.5 μm | 0.5 μm | 0.3 μm |
| Total thickness of magnetic layer + non-magnetic layer | 1.6 μm | 1.1 μm | 1.1 μm | 0.6 μm | 0.6 μm | 0.4 μm |
| Colloidal silica average particle size | 120 nm | 80 nm | 80 nm | 80 nm | 80 nm | 40 nm |
| Calender temperature | 80° C. | 90° C. | 90° C. | 90° C. | 90° C. | 110° C. |
| Center line average surface roughness Ra | 2.8 nm | 2.0 nm | 2.0 nm | 2.0 nm | 2.0 nm | 1.5 nm |
| Cooling zone staying time | 1 second | 1 second | 60 seconds | 60 seconds | 120 seconds | 180 seconds |
| Burnishing treatment before curing process | Performed | Performed | Performed | Performed | Performed | Performed |
| Logarithmic decrement | 0.048 | 0.048 | 0.034 | 0.033 | 0.020 | 0.015 |
| Head for evaluation | TMR | TMR | TMR | TMR | TMR | TMR |
| Number of times of occurrence of significant decrease in electric resistance (times) | 0 | 0 | 0 | 0 | 0 | 0 |
| Rate of decrease in resistance value (%) | 10 | 8 | 5 | 7 | 5 | 3 |

| | Evaluation Example 2-1 (reference evaluation example) | Evaluation Example 2-2 (reference evaluation example) | Evaluation Example 2-3 (reference evaluation example) | Evaluation Example 2-4 (reference evaluation example) | Evaluation Example 2-5 (reference evaluation example) | Evaluation Example 2-6 |
|---|---|---|---|---|---|---|
| Magnetic layer thickness | 0.1 μm | 0.1 μm | 0.1 μm | 0.1 μm | 0.1 μm | 0.1 μm |
| Non-magnetic layer thickness | 1.5 μm | 1.0 μm | 1.0 μm | 0.5 μm | 0.5 μm | 1.5 μm |
| Total thickness of magnetic layer + non-magnetic layer | 1.6 μm | 1.1 μm | 1.1 μm | 0.6 μm | 0.6 μm | 1.6 μm |

TABLE 1-continued

|  | | | | | | |
|---|---|---|---|---|---|---|
| Colloidal silica average particle size | 120 nm | 120 nm | 80 nm | 80 nm | 80 nm | 120 nm |
| Calender temperature | 80° C. | 90° C. | 90° C. | 80° C. | 90° C. | 80° C. |
| Center line average surface roughness Ra | 2.8 nm | 2.5 nm | 2.0 nm | 2.5 nm | 2.0 nm | 2.8 nm |
| Cooling zone staying time | Not performed | Not performed | Not performed | Not performed | Not performed | Not performed |
| Burnishing treatment before curing process | Not performed | Not performed | Not performed | Not performed | Not performed | Not performed |
| Logarithmic decrement | 0.060 | 0.062 | 0.062 | 0.063 | 0.062 | 0.060 |
| Head for evaluation | GMR | GMR | GMR | GMR | GMR | TMR |
| Number of times of occurrence of significant decrease in electric resistance (times) | 0 | 0 | 0 | 0 | 0 | 1 |
| Rate of decrease in resistance value (%) | 0 | 0 | 0 | 0 | 0 | — |

|  | Evaluation Example 2-7 | Evaluation Example 2-8 | Evaluation Example 2-9 | Evaluation Example 2-10 | Evaluation Example 2-11 |
|---|---|---|---|---|---|
| Magnetic layer thickness | 0.1 μm | 0.1 μm | 0.1 μm | 0.1 μm | 0.1 μm |
| Non-magnetic layer thickness | 1.0 μm | 1.0 μm | 0.5 μm | 0.5 μm | 0.3 μm |
| Total thickness of magnetic layer + non-magnetic layer | 1.1 μm | 1.1 μm | 0.6 μm | 0.6 μm | 0.4 μm |
| Colloidal silica average particle size | 120 nm | 80 nm | 80 nm | 80 nm | 40 nm |
| Calender temperature | 90° C. | 90° C. | 80° C. | 90° C. | 110° C. |
| Center line average surface roughness Ra | 2.5 nm | 2.0 nm | 2.5 nm | 2.0 nm | 1.5 nm |
| Cooling zone staying time | Not performed | Not performed | Not performed | Not performed | Not performed |
| Burnishing treatment before curing process | Not performed | Not performed | Not performed | Not performed | Not performed |
| Logarithmic decrement | 0.062 | 0.062 | 0.063 | 0.062 | 0.065 |
| Head for evaluation | TMR | TMR | TMR | TMR | TMR |
| Number of times of occurrence of significant decrease in electric resistance (times) | 3 | 7 | 9 | 10 | 10 |
| Rate of decrease in resistance value (%) | — | — | — | — | — |

As shown in Table 1, in Evaluation Examples 1-1 to 1-6, the number of times of occurrence of a significant decrease in electric resistance of the TMR head used as the head for evaluation was 0. Therefore, the magnetic tapes evaluated in Evaluation Examples 1-1 to 1-6 were determined as good products to be shipped as products (good product determination).

On the other hand, in Evaluation Examples 2-6 to 2-11, the number of times of occurrence of a significant decrease in electric resistance of the TMR head used as the head for evaluation was equal to or greater than 1. Therefore, it is determined that the magnetic tapes evaluated in Evaluation Examples 2-6 to 2-11 may not be shipped as products (defect determination).

Evaluation Example 2-1 and Evaluation Example 2-6, Evaluation Example 2-2 and Evaluation Example 2-7, Evaluation Example 2-3 and Evaluation Example 2-8, and Evaluation Example 2-4 and Evaluation Example 2-9 are examples in which the same magnetic tape was evaluated by using different heads for evaluation. From the comparison of the evaluation results of these evaluation examples, it is found that, in a case of using the TMR head as the head for evaluation, a significant decrease in electric resistance of the GMR head does not occur, even in a case of the magnetic tape causing a significant decrease in electric resistance. That is, it is possible to confirm that a significant decrease in electric resistance occurring in a case where the magnetic head slides on the magnetic tape is a phenomenon which occurs specifically in the TMR head.

In the evaluation examples, it was determined that the magnetic tape in which the logarithmic decrement acquired by a pendulum viscoelasticity test performed regarding the surface of the magnetic layer of the magnetic tape is equal to or smaller than 0.050 is a good magnetic tape which does not cause a decrease in electric resistance of the TMR head. However, the magnetic tape determined as a good product is not limited to the magnetic tape in which the logarithmic decrement acquired by a pendulum viscoelasticity test performed regarding the surface of the magnetic layer of the magnetic tape is equal to or smaller than 0.050. It is possible to determine that various magnetic tapes are magnetic tapes to be shipped as products and subjecting the magnetic tapes to the pre-shipment step for shipping the magnetic tapes as products, by assuming the determination as a good product by the evaluation method according to one aspect of the invention as one determination criterion.

One aspect of the invention is effective for usage of magnetic recording for which high-sensitivity reproducing of information recorded with high density is desired.

What is claimed is:

1. An evaluation method of a magnetic tape, in which the magnetic tape which is an evaluation target includes a magnetic layer including a servo pattern, the method comprising:
    reading the servo pattern by a magnetic head including a tunnel magnetoresistance effect type element as a servo pattern reading element;
    measuring electric resistance of the tunnel magnetoresistance effect type element after reading; and
    determining quality of the magnetic tape by using a degree of a decrease in the measured electric resistance from a reference value as an index.

2. The evaluation method of a magnetic tape according to claim 1,
    wherein the reference value is electric resistance of the tunnel magnetoresistance effect type element before the reading.

3. The evaluation method of a magnetic tape according to claim 1,
    wherein the center line average surface roughness Ra measured regarding a surface of the magnetic layer is equal to ors taller than 2.8 nm.

4. The evaluation method of a magnetic tape according to claim 3,
    wherein the center line average surface roughness Ra is equal to or smaller than 2.5 nm.

5. The evaluation method of a magnetic tape according to claim 1,
wherein the magnetic tape which is the evaluation target includes a non-magnetic support, and a magnetic layer including fern powder and a binding agent on the non-magnetic support.

6. The evaluation method of a magnetic tape according to claim 5,
wherein the magnetic tape which is the evaluation target includes a non-magnetic layer which includes non-magnetic powder and a binding agent between the non-magnetic support and the magnetic layer.

7. The evaluation method of a magnetic tape according to claim 6,
wherein the total thickness of the magnetic layer and the non-magnetic layer is equal to or smaller than 1.8 µm.

8. The evaluation method of a magnetic tape according to claim 7,
wherein the total thickness of the magnetic layer and the non-magnetic layer is equal to or smaller than 1.1 µm.

9. A manufacturing method of a magnetic tape, which comprises:
preparing a magnetic tape including a servo pattern in a magnetic layer;
evaluating the prepared magnetic tape by an evaluation method;
determining that the evaluated magnetic tape is a magnetic tape to be shipped as a product based on the determination as a good product by the evaluation as at least one of determination criteria; and
subjecting the determined magnetic tape to a pre-shipment step for shipping the magnetic tape as a product,
wherein the evaluation method comprises:
reading the servo pattern of the prepared magnetic tape by a magnetic head including a tunnel magnetoresistance effect type element as a servo pattern reading element;
measuring electric resistance of the tunnel magnetoresistance effect type element after the reading; and
determining quality of the magnetic tape by using a degree of a decrease in the measured electric resistance from a reference value as an index.

10. The manufacturing method of a magnetic tape according to claim 9,
wherein the reference value is electric resistance of the tunnel magnetoresistance effect type element before the reading.

11. The manufacturing method of a magnetic tape according to claim 9,
wherein the center line average surface roughness Ra measured regarding a surface of the magnetic layer is equal to or smaller than 2.8 nm.

12. The manufacturing method of a magnetic tape according to claim 11,
wherein the center line average surface roughness Ra is equal to or smaller than 2.5 nm.

13. The manufacturing method of a magnetic tape according to claim 9,
wherein the prepared magnetic tape includes a non-magnetic support, and a magnetic layer including ferromagnetic powder and a binding agent on the non-magnetic support.

14. The manufacturing method of a magnetic tape according to claim 13,
wherein the prepared magnetic tape includes a non-magnetic layer which includes non-magnetic powder and a binding agent between the non-magnetic support and the magnetic layer.

15. The manufacturing method of a magnetic tape according to claim 14,
wherein the total thickness of the magnetic layer and the non-magnetic layer is equal to or smaller than 1.8 µm.

16. The manufacturing method of a magnetic tape according to claim 15,
wherein the total thickness of the magnetic layer and the non-magnetic layer is equal to or smaller than 1.1 µm.

17. The evaluation method of a magnetic tape according to claim 1,
wherein the step of measuring the electric resistance of the tunnel magnetoresistance effect type element after the reading is carried out by bringing an electric resistance measuring device into contact with a wiring connecting two electrodes configuring the tunnel magnetoresistance effect type element included in the magnetic head after the reading of the servo pattern.

18. The manufacturing method of a magnetic tape according to claim 9,
wherein, in the recited the evaluation method, the step of measuring the electric resistance of the tunnel magnetoresistance effect type element after the reading is carried out by bringing an electric resistance measuring device into contact with a wiring connecting two electrodes configuring the tunnel magnetoresistance effect type element included in the magnetic head after the reading of the servo pattern.

* * * * *